United States Patent
Sutterlin et al.

(10) Patent No.: US 9,745,541 B1
(45) Date of Patent: Aug. 29, 2017

(54) METHODS FOR MAKING FREE FATTY ACIDS FROM SOAPS USING THERMAL HYDROLYSIS FOLLOWED BY ACIDIFICATION

(71) Applicant: Inventure Renewables, Inc., Tuscaloosa, AL (US)

(72) Inventors: William Rusty Sutterlin, Hoover, AL (US); Ryan Alexander Long, Northport, AL (US); Cory Oneil Blanchard, Birmingham, AL (US); John Brown, Tuscaloosa, AL (US)

(73) Assignee: INVENTURE RENEWABLES, INC., Tuscaloosa, AL (US)

( * ) Notice: Subject to any disclaimer, the term of this patent is extended or adjusted under 35 U.S.C. 154(b) by 0 days.

(21) Appl. No.: 15/291,329

(22) Filed: Oct. 12, 2016

Related U.S. Application Data

(60) Provisional application No. 62/385,883, filed on Sep. 9, 2016.

(51) Int. Cl.
  *C11C 3/00* (2006.01)
  *C11C 1/02* (2006.01)
  (Continued)

(52) U.S. Cl.
  CPC ............ *C11C 3/00* (2013.01); *C11B 3/04* (2013.01); *C11C 1/025* (2013.01); *C11C 1/04* (2013.01);
  (Continued)

(58) Field of Classification Search
  None
  See application file for complete search history.

(56) References Cited

U.S. PATENT DOCUMENTS 2,033,732 A    3/1936  Neiss
2,139,589 A *  12/1938 Ittner .................. C11C 1/04
                                              422/423
2,319,929 A *  5/1943  Hoffman .............. C11B 13/02
                                              554/155

(Continued)

FOREIGN PATENT DOCUMENTS

CN       101565654 A       10/2009
CN       103992883         8/2014
(Continued)

OTHER PUBLICATIONS

Holliday, R.L., et al., Hydrolysis of vegetable oils in sub- and supercritical water, 1997, Ind. ENg. Chem. Res, vol. 36, No. 3, pp. 932-935.*

(Continued)

*Primary Examiner* — Yate K Cutliff
(74) *Attorney, Agent, or Firm* — Greer, Burns & Crain, Ltd.; Gregory P. Einhorn

(57) ABSTRACT

Provided are methods, processes and systems for treating a soapstock. In alternative embodiments, provided are systems and methods for treating a soapstock to generate free fatty acids and/or fatty acid derivatives, e.g. fatty acid alkyl esters. In alternative embodiments, provided are systems and methods for realizing the full fatty acid yield of a soapstock by first converting substantially all of the saponifiable material in a soapstock to salts of fatty acids (soaps) and acidulating the soaps to generate free fatty acids and/or fatty acid derivatives, e.g. fatty acid alkyl esters, wherein the soapstock comprises soaps and saponifiable lipids, e.g. glycerides and/or phospholipids, and the generating of free fatty acids and/or fatty acid is achieved.

43 Claims, 4 Drawing Sheets

(51) Int. Cl.

| | | |
|---|---|---|
| *C11C 1/04* | (2006.01) | |
| *C11B 3/04* | (2006.01) | |
| C11B 3/00 | (2006.01) | |
| C11B 13/00 | (2006.01) | |
| C11B 13/02 | (2006.01) | |

(52) U.S. Cl.
CPC .............. *C11B 3/001* (2013.01); *C11B 13/00* (2013.01); *C11B 13/02* (2013.01)

(56) References Cited

U.S. PATENT DOCUMENTS

| | | | | |
|---|---|---|---|---|
| 2,390,528 | A * | 12/1945 | Freeman .................. | A23J 7/00 554/207 |
| 2,812,343 | A * | 11/1957 | Cox ........................ | C11B 13/02 554/179 |
| 2,831,006 | A * | 4/1958 | Schlenker ................. | C11C 1/04 554/160 |
| 2,895,976 | A * | 7/1959 | Kairys ................... | C07C 51/487 554/177 |
| 3,425,938 | A | 6/1967 | Bloomberg et al. | |
| 3,428,660 | A | 2/1969 | Morren | |
| 3,901,869 | A | 8/1975 | Bills | |
| 4,075,188 | A | 2/1978 | Vardell, Jr. | |
| 4,100,181 | A * | 7/1978 | Phillips ................... | C11B 13/02 554/155 |
| 4,118,407 | A | 10/1978 | Red et al. | |
| 5,210,242 | A | 5/1993 | Asbeck et al. | |
| 5,283,319 | A | 2/1994 | Huibers et al. | |
| 5,286,845 | A * | 2/1994 | Huibers .................... | C09F 1/00 530/208 |
| 5,487,817 | A | 1/1996 | Fizet | |
| 6,471,844 | B1 | 10/2002 | Samuels et al. | |
| 6,475,758 | B2 | 11/2002 | Reaney | |
| 6,855,838 | B2 | 2/2005 | Haas et al. | |
| 7,560,579 | B2 * | 7/2009 | Te Baay .................. | C07C 51/44 554/175 |
| 7,705,170 | B2 | 4/2010 | Geier et al. | |
| 2005/0043555 | A1 * | 2/2005 | Garro .................. | B01D 17/0202 554/126 |
| 2005/0255174 | A1 | 11/2005 | Shelley et al. | |
| 2011/0195471 | A1 * | 8/2011 | Berry ...................... | C07C 67/03 435/165 |
| 2014/0135515 | A1 * | 5/2014 | Dasari ...................... | C11B 3/04 554/212 |
| 2016/0201010 | A1 | 7/2016 | Berry et al. | |
| 2016/0207879 | A1 * | 7/2016 | Berry .................... | C07C 231/10 |

FOREIGN PATENT DOCUMENTS

| | | |
|---|---|---|
| EP | 0 160 326 A1 | 12/1984 |
| EP | 0406945 A2 | 1/1991 |
| WO | 9323132 A2 | 11/1993 |
| WO | 2005095565 A2 | 10/2005 |
| WO | 2009017957 A1 | 2/2009 |
| WO | 2016100944 A2 | 6/2016 |

OTHER PUBLICATIONS

King J.W. et al., Hdrolysis of Soybean oil, Dec. 1999, Green Chemistry, pp. 261-264.*
Sebastiao, J., et al., Hydrolysis of corn oil using subcritical water, 2006, J. Brazil Chem. Soc., vol. 17, No. 1, pp. 85-89.*
Sonntag, N.O.V., Fat Splitting, 1979, J. Am. Oil Chemists' Society, vol. 56, pp. 729A-732A.*
Akiya, Naoko, et al., "Roles of Water for Chemical Reactions in High-Temperature Water", Chem. Rev., vol. 102, (2002), pp. 2725-2750.
Beal, R.E., et al., "Treatment of Soybean Oil Soapstock to Reduce Pollution", Journal of the American Oil Chemists' Society, vol. 49, May 19, 1972, pp. 447-450.
Dayton, Christopher Lore Gene, et al., "Enzymatic Degumming", Green Vegetable Oil Processing (2014), pp. 107-146.
Deng, Qi, et al., "Study on Saponification Technology of Waste Edible Oil", 2009 3rd International Conference on Bioinformatics and Biomedical Engineering, (2009), 4 pages.
Dowd, Michael, K., "Gas chromatographic characterization of soapstocks from vegetable oil refining", Journal of Chromatography A, vol. 816, (1998), pp. 185-193.
Dumont, Marie-Josée, et al., "Characterization of soapstock and deodorizer distillates of vegetable oils using gas Chromatography", Lipid Technology, vol. 20, No. 6, (Jun. 2008), pp. 136-138.
Dumont, Marie-Josée, et al., "Soapstock and deodorizer distillates from North American vegetable oils: Review on their characterization, extraction and utilization", Food Research International, vol. 40, (2007), pp. 957-974.
Echim, Camelia, et al., "Production of biodiesel from side-stream refining products", Energy Environ. Sci., vol. 2, (2009), pp. 1131-1141.
Haas, Michael, J., et al., "Simple, High-Efficiency Synthesis of Fatty Acid Methyl Esters from Soapstock", JAOCS, vol. 17, No. 4, (2000), pp. 373-379.
Haas, Michael, J., et al., "Engine Performance of Biodiesel Fuel Prepared from Soybean Soapstock: A High Quality Renewable Fuel Produced from a Waste Feedstock", Energy & Fuels, vol. 15, (2001), pp. 1207-1212.
Haas, Michael, J., "Improving the economics of biodiesel production through the use of low value lipids as feedstocks: vegetable oil soapstock", Fuel Processing Technology, vol. 86, (2005), pp. 1087-1096.
Hangx, S.J.T., "Subsurface Mineralisation: Rate of CO2 Mineralisation and Geomechanical Effects on Host and Seal Formations, Behaviour of the CO2—H2O system and preliminary mineralisation model and experiments" Tech. Utrecht University: HPT Laboratory, Department of Earth Sciences, CATO-CO2 capture, transport and storage towards a clean use of fossil fuels in the energy economy, CATO Workpackage WP 4.1, (Dec. 2005), 43 pages.
Jin, B., et al., "Comprehensive utilization of the mixture of oil sediments and soapstocks for producing FAME and phosphatides", Fuel Processing Technology, vol. 89, (2008), pp. 77-82.
Kulkarni, B.M., et al., "Investigation of Acid Oil as a Source of Biodiesel", Indian Journal of Chemical Technology, vol. 15, (Sep. 2008), pp. 467-471.
Santos, Regiane Ribeiro Dos, "Characterization of Different Oil Soapstocks and Their Application in the Lipase Production by Aspergillus niger under Solid State Fermentation" Journal of Food and Nutrition Research, vol. 2, No. 9, (2014), pp. 561-566.
Solvay, BicarZ, "Sodium Bicarbonate" Downloaded on Apr. 15, 2015, 3 pages.
United States Department of Agriculture, "Tall Oil Technical Evaluation Report", Jan. 31, 2010, 13 pages.
Watanabe, Yomi, et al., "Enzymatic Production of Fatty Acid Methyl Esters by Hydrolysis of Acid Oil Followed by Esterification", J Am Oil Chem Soc, vol. 84, (2007), pp. 1015-1021.
Woerfel, J.B., et al., "Processing and Utilization of By-Products from Soy Oil Processing", JAOCS, vol. 58, Issue 3, (Mar. 1981), pp. 188-191.
Woerfel, J.B., et al. "Alternatives for Processing of Soapstock", JAOCS, vol. 60, No. 2, (Feb. 1983), pp. 262A-265A.

* cited by examiner

METHODS FOR MAKING FREE FATTY ACIDS FROM SOAPS USING THERMAL HYDROLYSIS FOLLOWED BY ACIDIFICATION

RELATED APPLICATIONS

This U.S. Utility Patent Application claims the benefit of priority under 35 U.S.C. §119(e) of U.S. Provisional Application Ser. No. 62/385,883, filed Sep. 23, 2016. The aforementioned application is expressly incorporated herein by reference in its entirety and for all purposes.

TECHNICAL FIELD

The present invention generally provides processes for treating a soapstock and making free fatty acids. Provided are systems and methods for treating a soapstock or any composition comprising a mixture of triglycerides of fatty acids to generate free fatty acids and/or fatty acid derivatives, e.g. fatty acid alkyl esters such as fatty acid methyl esters. Provided are systems and methods for realizing the full fatty acid yield of a soapstock by first thermally hydrolyzing the saponifiable material in a soapstock and then acidulating the soaps to generate free fatty acids and/or fatty acid derivatives, e.g. fatty acid alkyl esters. In alternative embodiments, the soapstock comprises a soap or any saponifiable lipid, e.g. glycerides, triglycerides and/or phospholipids, and the generating of free fatty acids and/or fatty acid is achieved.

BACKGROUND

Crude (unrefined) animal and vegetable oils (referred to herein collectively as "natural oils") are typically subjected to a variety of processing steps to remove specific undesirable components of the crude oil prior to sale. The type, number, and sequencing of processing steps can vary depending on the crude oil feedstock, refinery type (e.g. physical vs. alkaline) and configuration, target product markets, and the like. In general, crude natural oils are refined to remove excess quantities of "gums" (comprised primarily of phospholipids), free fatty acids, as well as various coloring components and volatile compounds.

Once removed from the crude oil, the refining byproducts are either sold directly into low-value markets such as animal feed, or further processed into higher-value products. Two major byproducts of the chemical refining processes of natural oils are soapstock and gums. In most natural oil refineries utilizing the chemical refining process, phosphoric acid or an equivalent acid is added to the crude oil to increase the solubility of the phospholipids (gums) in water. Next, a strong base, typically sodium hydroxide (NaOH) is added, reacting with the free fatty acids in the oil to form soaps (salts of free fatty acids). Water is then added to the oil to remove the soaps and solubilized gums. Soapstock is typically acidulated to generate free fatty acids. Gums are typically sold into low-value animal feed markets or upgraded to food-grade emulsifiers, e.g. lecithin.

In most chemical refining configurations, additional waste streams are generated which represent low- or negative-value byproducts. For example, it typically necessary to perform an additional water wash on the oil after the majority of the gums and soaps have been removed. The lipid content of this washwater (referred to as Soapstock Makeup) can contain from about 5% to about 20% soaps and other lipids, but the lipid content is generally not sufficiently high to justify the costs of further processing into value added products. In addition, all of the above referenced byproduct streams from the chemical refining process contain various amounts of saponifiable (triglyceride-comprising) material that are not converted to free fatty acids.

SUMMARY

In alternative embodiments, provided are processes and systems for treating or processing a soapstock. In alternative embodiments, provided are systems and methods for treating a soapstock, or any triglyceride comprising material, to generate free fatty acids and/or fatty acid derivatives, e.g. fatty acid alkyl esters such as fatty acid methyl esters.

In alternative embodiments, provided are methods and systems for generating free fatty acids from a mixed lipid feedstock. In alternative embodiments, a mixed lipid feedstock, e.g., from an animal or plant source, is provided. The feedstock is first heated and pressurized (hereinafter referred "thermal hydrolysis") to produce fatty acids. The reacted first mixture is combined with an acid or acid solution, thereby acidulating soaps unreacted in the first step to generate additional free fatty acids.

In alternative embodiments, the method further comprises additional steps, e.g., as described herein. For example, in alternative embodiments, the generated free fatty acids can be esterified with an alcohol to form a second mixture, thereby esterifying substantially all of the free fatty acids to generate fatty acid alkyl esters. The generated free fatty acids can be separated, isolated, or purified into separate fractions. The mixed lipid feedstock can be selected from the group consisting of a soapstock, a washwater comprising soaps, and a combination thereof as generated during the chemical refining of a crude natural oil. The mixed lipid feedstock can be a tall oil soapstock. The crude natural oil can be a vegetable oil. The vegetable oil can be selected from the group consisting of soybean oil, canola oil, rapeseed oil, corn oil, rice oil, sunflower oil, peanut oil, sesame oil, palm oil, algae oil, jatropha oil, castor oil, safflower oil, grape seed oil, and any combination of vegetable oils. The mixed lipid feedstock can further comprise: water, soaps, phospholipids, saponifiable material, and unsaponifiable material. The acid can be carbonic acid. The carbonic acid can be generated by adding carbon dioxide to the thermal hydrolysis product mixture, thereby causing the carbon dioxide to react with the water in the thermal hydrolysis product mixture to form carbonic acid.

In alternative embodiments, also provided are methods and systems for generating free fatty acids from a mixed lipid feedstock. In alternative embodiments, a mixed lipid feedstock is provided and subjected to thermal hydrolysis. The mixture is allowed to react in a reaction vessel. In alternative embodiments, carbon dioxide, if used, is introduced into the reacted mixture in the reaction vessel to form a first carbonic acid within the reaction vessel. Alternatively, a carbonic acid can be mixed with the reacted mixture within the reaction vessel. In alternative embodiments, the carbonic acid and reacted mixture is allowed to settle within the reaction vessel. A first aqueous layer can be drained from the reaction vessel.

In alternative embodiments, the carbon dioxide is introduced as a gaseous flow of carbon dioxide into the reaction vessel. The carbon dioxide can be introduced as a liquid flow of carbon dioxide into the reaction vessel. In a second acidulation reaction, carbon dioxide can be introduced into the reacted mixture in the reaction vessel to form a second carbonic acid within the reaction vessel. The second carbonic acid (of the second acidulation reaction) can be mixed with the reacted mixture within the reaction vessel. The second carbonic acid and reacted mixture can be allowed to settle within the reaction vessel. A second aqueous layer (of the second acidulation reaction) can be drained from the reaction vessel. In an alternative embodiment, an objective is to reach an equilibrium between carbonic acid and sodium bicarbonate, and this can be achieved through multiple acidulation steps as required by the different feedstocks, for example, optionally up to 20 acidulation steps, or more if desired or necessary, can be used to achieve a high, or the highest possible, yield of fatty acids.

In alternative embodiments, provided are methods for generating free fatty acids from a castor oil. In alternative embodiments, the castor oil is reacted via thermal hydrolysis in a reaction vessel. Carbon dioxide is introduced into the reacted mixture in the reaction vessel to form a carbonic acid within the reaction vessel. The carbonic acid and the reacted mixture is then mixed within the reaction vessel. The carbonic acid and reacted mixture is allowed to settle within the reaction vessel. An aqueous layer is drained from the reaction vessel.

In alternative embodiments, the carbon dioxide is introduced as a gaseous or liquid flow of carbon dioxide into the reaction vessel. In a second acidulation reaction, carbon dioxide can be introduced into the reacted mixture in the reaction vessel to form a second carbonic acid within the reaction vessel. The second carbonic acid can be mixed with the reacted mixture within the reaction vessel. The second carbonic acid and reacted mixture can be allowed to settle within the reaction vessel. A second aqueous layer (from the second acidulation reaction) can be drained from the reaction vessel.

In alternative embodiments, provided are methods and processes for generating free fatty acids from a mixed lipid feedstock using a thermal hydrolysis reaction, the method or process comprising:

(a) providing an aqueous solution or mixture comprising a mixed lipid feedstock, and wherein optionally the mixed lipid feedstock comprises: a soapstock; a triglyceride comprising material; a saponifiable material (optionally a glyceride or a phospholipid); a tall oil ("liquid rosin" or tall oil) soapstock; a gums product (optionally chemically or enzymatically derived); a crude biodiesel; a fatty acid (optionally from a distillation bottom); a fat splitter emulsion (optionally purged from fat splitter due to accumulation when recycled); or, any combination thereof, and optionally the mixed lipid feedstock comprises a soapstock, a washwater comprising soaps or a combination thereof, optionally generated during the chemical refining of a crude natural oil, and optionally the mixed lipid feedstock is derived from a biomass, a crude natural oil, or a plant or an animal source (optionally a tallow);

and optionally the mixed lipid feedstock is derived from enzymatic degumming of edible and inedible oils; and (b) heating and pressurizing the aqueous solution or mixture comprising the mixed lipid feedstock in a thermal hydrolysis reaction under conditions comprising sufficient pressure and temperature to generate a first reaction mixture comprising a free fatty acid and/or a soap (a fatty acid salt), and/or a glyceride (optionally monoacylglycerol (MAG), diacylglycerol (DAG), or triacylglycerol (TAG)), wherein the thermal hydrolysis reaction is carried out at a temperature in the range of between about 20° C. to about 600° C., and at a pressure of between about 300 to about 2000 psig (about 20.7 bar to about 137.9 bar), and for between about 1 second (sec) to about 3000 minutes (min), or between about 1 min to about 300 min, or between about 5 min to 200 min, and optionally the amount of water in the thermal hydrolysis reaction is between about 2:1 water-to-total dissolved solids (TDS) present in the mixed lipid feedstock to about 15:1 TDS, or about 10:1 TDS; or between about 1:1 TDS present in the mixed lipid feedstock to about 100:1 TDS, and optionally a solvent is added to the thermal hydrolysis reaction in an amount of between about 0.01:1 water-to-total dissolved solids (TDS) present in the mixed lipid feedstock to about 100:1 TDS, or about 10:1 TDS.

In alternative embodiments, methods and processes as provided herein further comprise an acidification reaction that takes place after or during (simultaneous with) the thermal hydrolysis step, comprising:

(a) providing an acid or an acid solution or a gas capable of forming an acid when mixed with water, optionally a carbon dioxide ($CO_2$) or a stack gas; and (b) combining or mixing the first reaction mixture with the acid or acid solution or the gas, optionally $CO_2$, or mixing the first reaction mixture with the acid or acid solution or the gas, optionally $CO_2$, to have an acidulation reaction and to generate a second reaction mixture, wherein the first reaction mixture is combined or mixed with the acid or acid solution or the gas, optionally $CO_2$, for a sufficient amount of time to acidulate (partially, or substantially all of) the soap in the first reaction mixture to generate free fatty acids from the acidulated soaps, and optionally the pH of the acidulation reaction mixture is less than about pH 5, or is between about pH 1 to pH 6, or is about pH 1, 2, 3, 4, 5 or 6, and optionally the amount of the gas is sufficient to increase the pressure of the reaction mixture, optionally in a reaction vessel, in which the acidulation reaction is being carried out to between about 0 and about 2000 psig.

In alternative embodiments, methods and processes as provided herein further comprise mixing the second reaction mixture with an alcohol to form a third reaction mixture comprising fatty acid alkyl esters, wherein optionally the mixing is done under conditions comprising between about 240° C. to about 350° C., or 200° C. to 400° C., and a pressure of between about 1400 psi to about 3000 psi, wherein optionally substantially all of the free fatty acids are esterified to generate fatty acid alkyl esters, optionally, fatty acid methyl esters, and optionally the alcohol comprises methanol, ethanol or a mixture thereof.

In alternative embodiments, methods and processes as provided herein further comprise separating, isolating, and/or purifying the free fatty acids and/or the fatty acid alkyl esters into separate fractions.

In alternative embodiments, methods and processes as provided herein further comprise a pre-treatment acidification reaction step for treating the mixed lipid feedstock before the thermal hydrolysis reaction, wherein the pre-treatment acidification reaction step comprises:

(a) (i) providing an acid or an acid solution or a gas capable of forming an acid when mixed with water, optionally a carbon dioxide ($CO_2$) or a stack gas; and (ii) combining or mixing the mixed lipid feedstock with the acid or acid solution or the gas, optionally $CO_2$, or mixing the mixed lipid feedstock with the acid or acid solution or the gas, optionally $CO_2$, to have an acidulation reaction and to generate a pre-treated mixed lipid feedstock, wherein the mixed lipid feedstock is combined or mixed with the acid or acid solution or the gas, optionally $CO_2$, for a sufficient amount of time to acidulate (partially, or substantially all of) the soap in the mixed lipid feedstock, and optionally the pH of the pre-treatment acidulation reaction mixture is less than about pH 5, or is between about pH 1 to pH 6, or is about pH 1, 2, 3, 4, 5 or 6, and optionally the amount of the gas is sufficient to increase the pressure of the pre-treatment reaction mixture, optionally in a reaction vessel, in which the pre-treatment acidulation reaction is being carried out to between about 0 and about 2000 psig; or (b) electrolysis (optionally using a hydrogen evolving cathode (HEC) electrolysis unit) of the mixed lipid feedstock for a sufficient amount of time to acidulate (partially, or substantially all of) the soap in the mixed lipid feedstock.

In alternative embodiments, the natural oil or crude natural oil comprises a vegetable oil, wherein optionally the vegetable oil comprises a soybean oil, a canola oil, a rapeseed oil, a corn oil, a rice oil, a sunflower oil, a peanut oil, a sesame oil, a palm oil, an algae oil, a jatropha oil, a castor oil, a safflower oil, a grape seed oil or any combination thereof, and optionally the natural oil or crude natural oil comprises castor oil, and optionally a free fatty acid generated is ricinoleic acid (12-hydroxy-9-cis-octadecenoic acid).

In alternative embodiments, the mixed lipid feedstock further comprises additional water, a phospholipid and/or an unsaponifiable material.

In alternative embodiments, the acid or acid solution comprises carbonic acid, and optionally the carbonic acid is generated by adding carbon dioxide ($CO_2$) to the first reaction mixture, thereby causing the carbon dioxide to react with water in the first reaction mixture to form carbonic acid, and optionally a source of the carbon dioxide ($CO_2$) comprises a stack gas or a flue gas, or a gaseous $CO_2$ emitted from an industrial process or an oven, a furnace, a boiler, a steam generator, a coal fired power plant, an ethanol plant, a brewery, or an industrial process wherein a gaseous waste stream comprising $CO_2$ is emitted.

In alternative embodiments, the heating and pressurizing of the mixed lipid feedstock is done in a single vessel, or sequential, different, reaction vessels; and optionally the pre-treatment and the thermal hydrolysis are done in a single reaction vessel, and optionally the pre-treatment, the thermal hydrolysis and the post-thermal hydrolysis acidulation are done in the same reaction vessel.

In alternative embodiments, the carbon dioxide is added to the first reaction mixture, optionally as a liquid, a carbon dioxide gas, or as a gaseous flow of carbon dioxide into the reaction vessel.

In alternative embodiments, the soapstock is obtained from the alkaline neutralization of a crude natural oil.

In alternative embodiments, the gums product comprises phospholipids, and optionally the gums product is generated during the degumming of a natural oil.

In alternative embodiments, the mixed lipid feedstock comprises, or further comprises, one or more compounds produced as a byproduct from the water washing of crude biodiesel, wherein optionally the compounds comprise soapstock, monoglycerides, diglycerides, triglycerides and/or fatty acid alkyl esters or any combination thereof.

In alternative embodiments, the method is a batch or a continuous process.

In alternative embodiments, the heating and pressurizing the mixed lipid feedstock takes place in conditions comprising: temperature in a range of between about 100° C. to 500° C., or 200° C. to 400° C., or 240° C. to 300° C., or at about 260° C.; and/or a pressure of between about 650 and 750 psig, between about 750 and 850 psig, between about 850 and 1000 psig, between about 1000 and 1500 psig, or between about 1500 psig and 1800 psig; and/or for between about 20 and 30 minutes, or between about 160 and 180 minutes, or between about 300 minutes and 500 minutes.

In alternative embodiments, the amount of gas is sufficient to increase the pressure of the reaction mixture, optionally in a reaction vessel, in which the acidulation reaction is being carried out to between about 10 and 1000 psig, about 20 to about 600 psig, about 30 to about 500 psig, about 40 to about 400 psig, about 50 to about 300 psig, about 60 to about 200 psig, about 60 to about 150 psig, about 70 to about 140 psig, about 80 to about 120 psig, about 90 to about 110 psig, or about 100 psig.

In alternative embodiments, the acidulation reaction is carried out at a temperature in the range of between about 5° C. to about 400° C., e.g. about 10° C. to about 90° C., about 15° C. to about 70° C., about 20° C. to about 60° C., or about 25° C. to about 40° C.

In alternative embodiments, the acid or acid solution comprises an organic and/or an inorganic acid (a mineral acid), a hydrochloric acid, a sulfuric acid, a formic acid or sodium bisulfate, and optionally when a stack gas comprising $N_2O$, $NO_x$ (optionally $NO_2$), $SO_x$ (optionally $SO_2$), or $H_2S$ is used the $N_2O$, $NO_x$, $SO_x$, or $H_2S$ reacts with water in the acidulation reaction mixture to form equivalent aqueous acid species.

In alternative embodiments, after a reaction vessel has reached a desired temperature and pressure to carry out the acidulation step, the resulting reaction mixture is agitated, or otherwise mixed in order to maximize the contacting of the soaps with the acid, optionally carbonic acid, and optionally the mixture can be agitated using a spinning blade mixer, and optionally the mixture is agitated for between about 10 minutes to about 200 minutes, e.g. between about 25 minutes to about 150 minutes, or between about 20 minutes to about 60 minutes, or about 30 minutes.

In alternative embodiments, after the acidulation reaction, and optionally following an agitation step, the contents of the acidulation reaction, optionally in a reaction vessel, are allowed to settle or partition allowing for the formation (separation) of a lipid layer and aqueous layer, wherein the lipid layer floats on the top of the aqueous layer, and optionally the lipid layer comprises free fatty acids and any non-acidulated soaps, and the aqueous layer comprises water, glycerol, phosphate salts, sodium bicarbonate, sodium carbonate or other equivalent salts, unsaponifiable material (optionally waxes and sterols), and dissolved carbonic acid.

In alternative embodiments, before or after the reaction products of the acidulation reaction, optionally in a reaction vessel, are allowed to settle or partition, the reaction products of the acidulation step are transferred to a separation vessel, optionally a decanter, a settler or an equivalent, or a centrifuge where a lipid phase or component or separates or partitions out from an aqueous phase or component; or, the acidulation product mixture is not transferred to a separate vessel in order to separate lipids (the lipid phase or component) from reaction products in an aqueous phase or component, and after the lipid phase or component or separates or partitions out from the aqueous phase or component the aqueous layer is drained from the bottom of the reaction vessel and the lipid layer (the lipid phase or component) is recovered as the reaction product.

In alternative embodiments, methods and processes can further comprise multiple acidulation reactions, optionally between about 1 and 20 additional acidulation reactions, or about 1, 2, 3, 4, 5, 6, 7 or 8 or more additional acidulation reactions.

The method of any of the preceding claims, wherein after the acidulation reaction the reaction vessel is depressurized, allowing for dissolved carbonic acid or other gaseous acid to separate out of the solution as gaseous $CO_2$, or equivalents, and optionally captured $CO_2$ is recycled for use in the further acidulation reactions.

In alternative embodiments, the solvent added to the thermal hydrolysis reaction is a polar (optionally a methanol) or a non-polar (optionally a hexane) solvent.

In alternative embodiments, the thermal hydrolysis reaction and the acidulation reaction take place sequentially; or, the thermal hydrolysis reaction and the acidulation reaction can take place simultaneously as a "one pot" reaction in one reaction vessel.

In alternative embodiments, the lipid phase or component, optionally comprising unreacted soaps, is transferred to an electrolysis unit (optionally a hydrogen evolving cathode (HEC) electrolysis unit) wherein the lipid phase is reacted with an anolyte (optionally the anolyte comprises a sodium or potassium sulfate, a sodium or potassium nitrate, or a sodium or potassium chloride) such that the unreacted soaps generate free fatty acids, and optionally the electrolysis step converts substantially all, or about 90%, 95%, 98% or more of the unreacted soaps to free fatty acids, wherein optionally the anode comprises a mixed metal oxide (MMO) layer coated onto a stable metal substrate, optionally a titanium.

In alternative embodiments, the lipid phase or component is transferred to an electrolysis unit (optionally a hydrogen evolving cathode (HEC) electrolysis unit) comprising a vessel or suitable container comprising an anode (e.g., an anode vessel) and a vessel or other suitable container comprising a cathode (an cathode vessel) separated by a selective filtration membrane, optionally a polytetrafluoroethylene (PTFE) membrane, wherein optionally the anode comprises a mixed metal oxide (MMO) layer coated onto a stable metal substrate, optionally a titanium, and optionally the cathode comprises a titanium or a Monel alloy, or any substrate that is stable in a reducing environment.

In alternative embodiments, the aqueous phase or component, or multiple aqueous phases if collected from multiple acidulation reactions, is treated to remove water, wherein optionally the treatment of the aqueous phase or component to remove water is by a drying method, optionally evaporation via falling film, forced recirculation flashing or equivalent, thereby generating a product comprising sodium bicarbonate, and optionally the product is dried further to generate a sodium bicarbonate product that is substantially free of any water, optionally less than about 20% water or less than about 10% water, and optionally the drying is done using a fluidized bed dryer, a lyophilizer, a spray dryer, or a rotary drum dryer.

In alternative embodiments, the aqueous phase or component, or multiple aqueous phases if collected from multiple acidulation reactions, is treated using a filtration, optionally a membrane filtration system, a nano- or microfiltration system or a size-exclusion filtration system, and optionally the filtration is operationally in-line operating continuously with the acidulation step such that aqueous phase generated in the acidulation reaction (or each acidulation reaction if more than one acidulation reaction) is treated immediately after or during the point at which the aqueous phase is separated from the lipid phase, and optionally the aqueous phase is collected and treated in a single batch.

In alternative embodiments, soaps and/or other saponifiable material rejected by the filtration (optionally, soaps and/or other saponifiable material that do not pass through a membrane of a filter system) are returned to the lipid phase for subsequent acidulation reactions, thereby increasing the overall fatty acid yield.

In alternative embodiments, the aqueous phase or component, or multiple aqueous phases if collected from multiple acidulation reactions, is treated with calcium hydroxide (optionally slaked lime) to form a calcium precipitate, optionally a calcium phosphate ($Ca_x(PO_4)_x$) precipitate. In alternative embodiments, the lime-treated aqueous phase or component, or multiple aqueous phases if collected from multiple acidulation reactions, is subjected to an oxidation step, optionally a Fenton oxidation wherein hydrogen peroxide and $Fe^{2+}$ ions are used to catalyze OH radical formation.

In alternative embodiments, the aqueous phase or component, or multiple aqueous phases if collected from multiple acidulation reactions, is subjected to electrolysis to recover monovalent ions as a base for a value added product, wherein electrical current is passed through a cathode, the water is reduced, thereby generating hydroxide ions; and as monovalent ions (optionally sodium or potassium) are pushed across a membrane (separating an anode vessel from a cathode vessel) into the cathode vessel, they react with the generated hydroxide ions to generate a corresponding hydroxide base (optionally a sodium hydroxide or a potassium hydroxide), and optionally the hydroxide base separated out, recovered and/or isolated.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

All publications, patents, patent applications cited herein are hereby expressly incorporated by reference for all purposes.

BRIEF DESCRIPTION OF THE DRAWINGS

The drawings set forth herein are illustrative of exemplary embodiments provided herein and are not meant to limit the scope of the invention as encompassed by the claims.

Like reference symbols in the various drawings indicate like elements.

Figure 1:
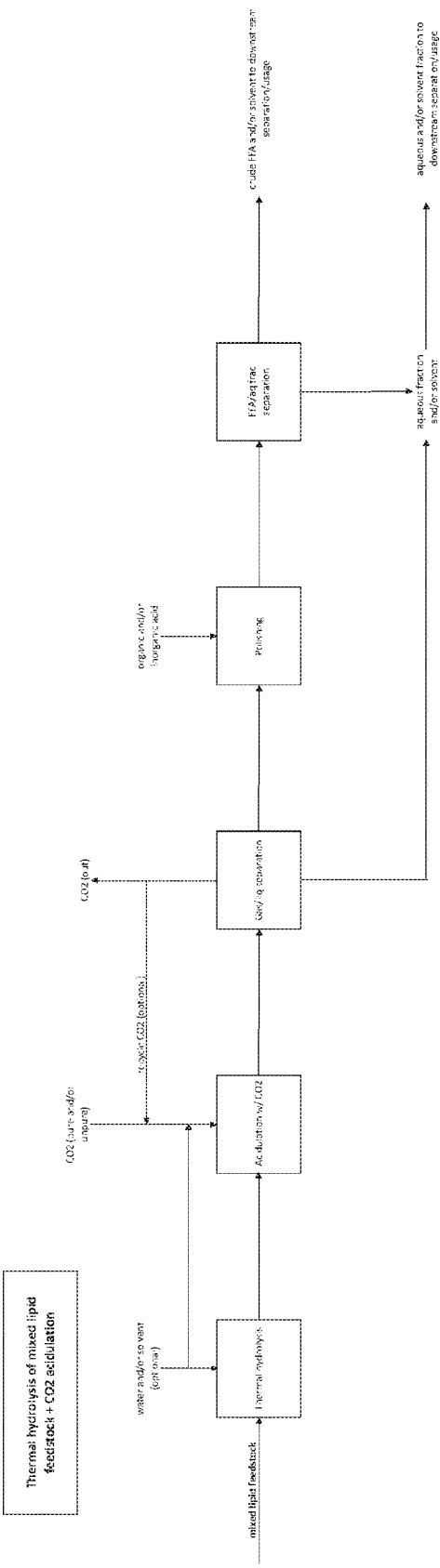
FIG. 1 is a flow diagram of an exemplary method as provided herein comprising generating free fatty acids from a mixed lipid feedstock comprising soaps, saponifiable material or equivalents thereof comprising use of thermal hydrolysis followed by acidulation with $CO_2$.
Figure 2:
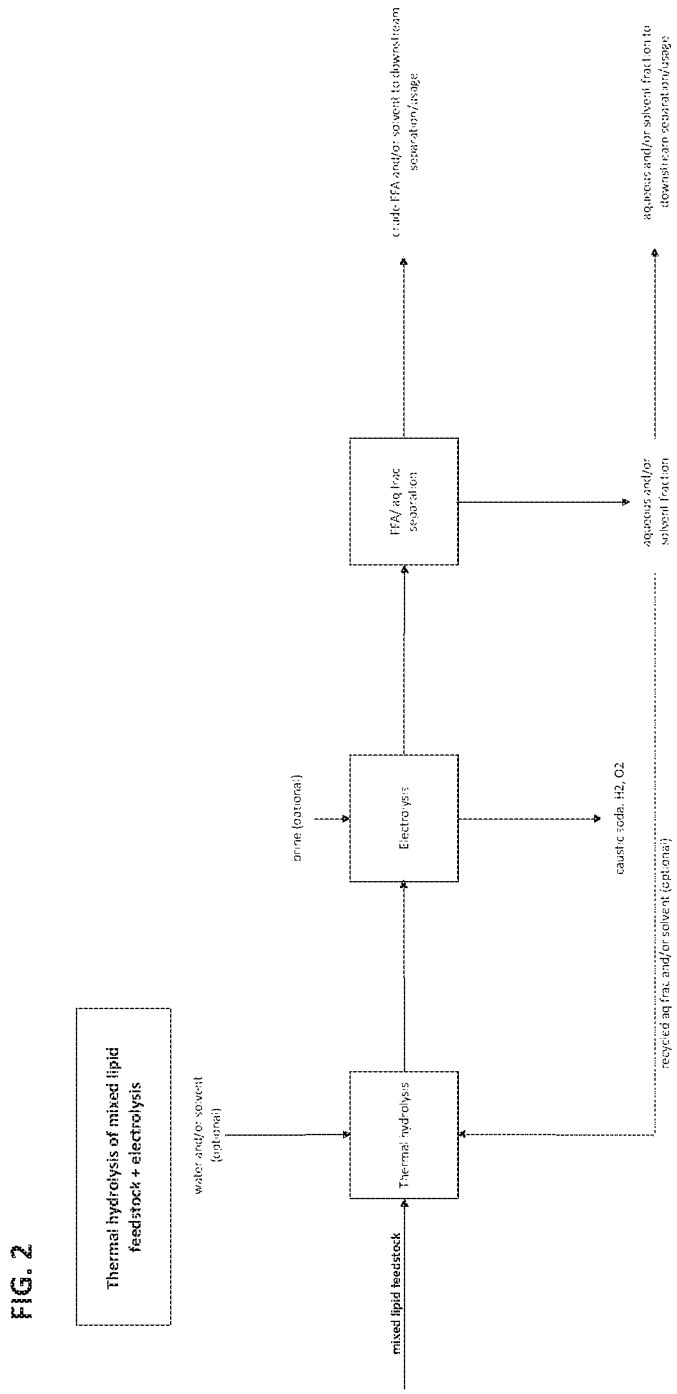
FIG. 2 is a flow diagram of an exemplary method as provided herein comprising generating free fatty acids from a mixed lipid feedstock comprising soaps, saponifiable material or equivalents thereof comprising use of thermal hydrolysis followed by electrolysis.
Figure 3:
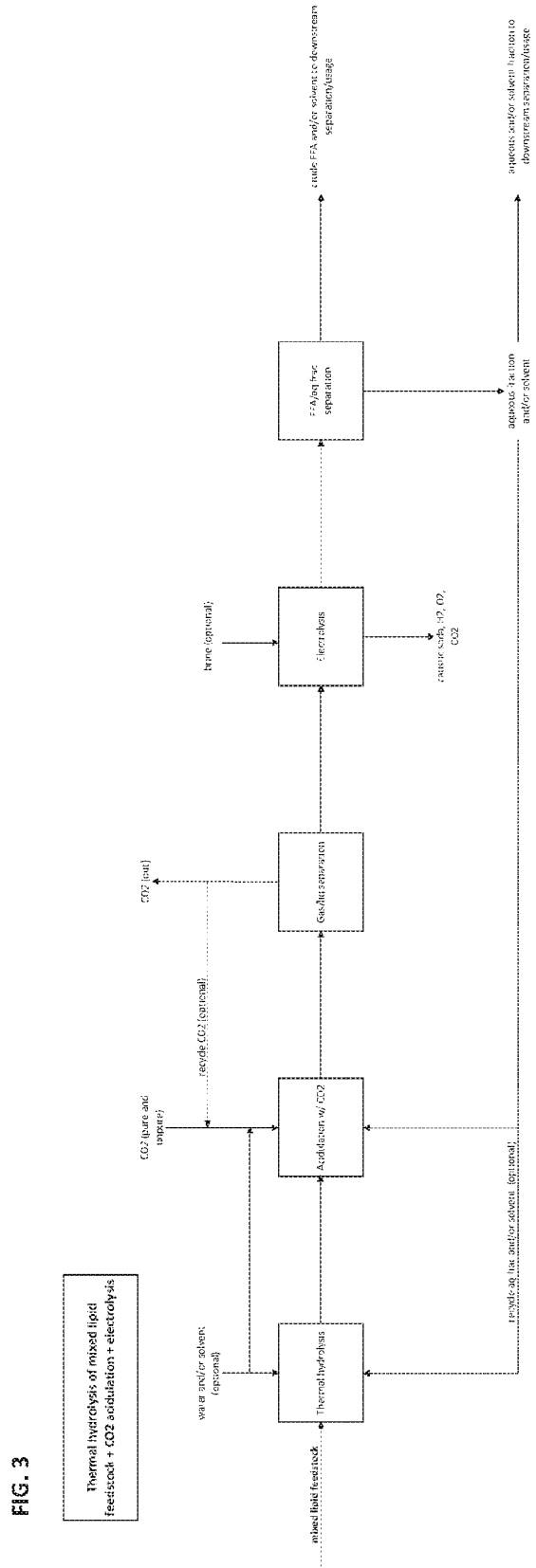
FIG. 3 is a flow diagram of an exemplary method as provided herein comprising generating free fatty acids from a mixed lipid feedstock comprising soaps, saponifiable material or equivalents thereof comprising the use of thermal hydrolysis, followed by acidulation with $CO_2$, and then electrolysis.
Figure 4:
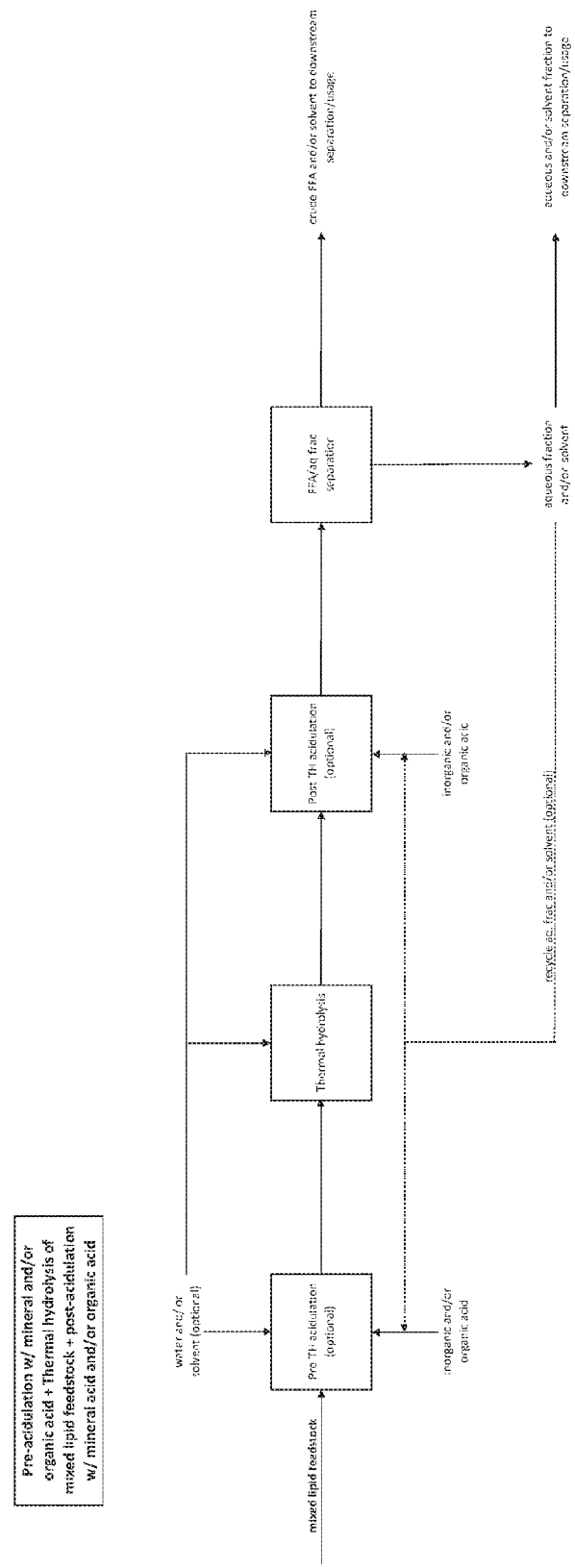
FIG. 4 is a flow diagram of an exemplary method as provided herein comprising generating free fatty acids from a mixed lipid feedstock comprising soaps, saponifiable material or equivalents thereof, the method comprising the use of acidulation with an organic and/or mineral acid prior to thermal hydrolysis; thermal hydrolysis is performed followed by acidulation with the mineral and/or organic acid.

Reference will now be made in detail to various exemplary embodiments of the invention. The following detailed description is provided to give the reader a better understanding of certain details of aspects and embodiments of the invention, and should not be interpreted as a limitation on the scope of the invention.

DETAILED DESCRIPTION OF THE INVENTION

In alternative embodiments, provided are methods, systems and processes for the preparation of fatty acids and optionally fatty acid derivatives, e.g. fatty acid alkyl esters, from mixed lipid feedstocks comprising saponifiable material or any triglyceride comprising material, including byproduct streams of natural oil processing e.g. soapstocks, gums, or mixtures thereof. In alternative embodiments, the feedstock comprises soapstock obtained from the alkaline neutralization of a crude natural oil. In alternative embodiments, the feedstock comprises the gums product (comprising primarily phospholipids) generated during the degumming of a natural oil. In alternative embodiments, the feedstock comprises a mixture of product streams generated during the processing of a crude natural oil and comprises soaps as well as saponifiable lipids, e.g. phospholipids. glycerides, e.g. mono-, di-, and/or triglycerides, or any combination thereof.

In alternate embodiments, the mixed lipid feedstock comprises a mixture of soapstock and monoglycerides produced as a byproduct from the water washing of crude biodiesel.

In alternative embodiments, processes and methods as provided herein are more economical and efficient than currently used approaches for the treatment of natural oil processing byproducts, e.g., soapstocks and gums, to generate fatty acids, fatty acid derivatives, or other value-added products.

In alternative embodiments, a mixed lipid feedstock, e.g. a soapstock comprising soaps as well as saponifiable material (e.g. glycerides and/or phospholipids) is reacted by thermal hydrolysis, thereby generating a product in which substantially all of the free fatty acids are cleaved from their respective glycerol backbones or phosphate groups. The soaps present in the product stream generated in foregoing the saponification step are then separated and reacted with an acid in the acidulation step of the process, in which optionally substantially all of the soaps are acidulated to form free fatty acids.

In alternative embodiments, the mixed lipid feedstock comprises crude (unrefined) natural oils, including plant- and animal-derived oils, which are comprised primarily of triacylglycerols (i.e. triglycerides), as well as smaller portions of various lipids including mono- and diacyl-glycerols, (i.e. mono-glycerides and di-glycerides, respectively), free fatty acids, phospholipids, waxes, and other non-lipid components including, for example, ketones, aldehydes, and hydrocarbons.

In alternative embodiments, prior to sale for human consumption or for further processing, a crude natural oil is refined to remove the majority of the non-triglyceride components. The majority of natural oils can be refined using a chemical refining process. In the first stage of the chemical refining process, referred to as "degumming", crude oils are first washed with water to remove the hydratable phospholipids (gums). The resulting product stream separated from the oil during the degumming step is referred to as "gums." Second, the degummed oils are subjected to a neutralization step in which the degummed oil is treated with a strong base, e.g. sodium hydroxide. During the neutralization step, free fatty acids present in the oil react with the base to form soaps (salts of fatty acids). In alternative embodiments an additional processing step between the degumming and neutralization step is used in which a small amount of a mineral acid, e.g. phosphoric acid or citric acid, is added to the degummed oil to convert any non-hydratable phospholipids into hydrated phospholipids. After the neutralization step, the oil is washed to remove the soaps and, if the oil was treated with a mineral acid, the hydrated phospholipids. The resulting product stream separated from the oil during the neutralization step is referred to as "soapstock." If the oil is to be sold for human consumption, the degummed, neutralized oil is then subjected to further processing including, e.g. bleaching and deodorization steps.

Alternatively, in the production of biodiesel used to practice methods provided herein, a lipid mixture is generated as a byproduct. In the production of biodiesel, fatty acids are esterified by several means including by enzymatic reaction, acid/base reactions, supercritical alcohol, and/or ultrasonically. The reaction generates water, which in turn back reacts with the esters to generate monoglycerides and free fatty acids. The removal of these impurities is achieved by water and/or base washing the crude biodiesel. The washing generates a lipid mixture product of soap, water, and/or monoglycerides, which is regarded as a waste stream in the process of biodiesel refining. This subsequent soapstock can be utilized in the thermal hydrolysis process provided herein producing high yield free fatty acids as a value added product for the biodiesel processors.

In alternative embodiments, the configuration of the refinery varies, and soapstock and gums can be either stored separately or combined into a single storage container. In alternative embodiments, a "mixed lipid feedstock" refers to any material or composition comprising soaps as well saponifiable material, i.e. lipids capable of reacting to produce soaps (salts of fatty acids). Saponifiable material in the mixed lipid feedstock can include, without limitation, glycerides, e.g. mono-glycerides, di-glycerides, or triglycerides, or a combination thereof, and/or phospholipids. In alternative embodiments, the mixed lipid feedstock is a soapstock. In alternative embodiments, the mixed lipid feedstock comprises soaps and saponifiable lipids e.g. glycerides and/or phospholipids. In alternative embodiments, the mixed lipid feedstock is a mixture of soapstocks, comprising soaps, saponifiable material, e.g. glycerides and/or phospholipids, obtained during the processing of a natural oil. In alternative embodiments, the mixed lipid feedstock is a soapstock washwater obtained from the processing of a crude natural oil following the neutralization step in the chemical refining process. In such embodiments, the washwater can comprise water and soapstock, wherein the soapstock comprises soaps, glycerides, phospholipids, free fatty acids, and unsaponifiable material e.g. waxes and/or sterols. In alternative embodiments, the soapstock washwater can comprise between about 1% soapstock to about 100% soapstock, e.g. between about 2% and 80% soapstock, about 3% and 70% soapstock, about 4% and about 60% soapstock, about 5% and about 50% soapstock, about 6% and about 40% soapstock, about 7% and about 30% soapstock, about 8% and about 20% soapstock, about 9% and about 15% soapstock, or between about 20% and about 12% soapstock, the remaining portion of the soapstock washwater comprising water.

In alternative embodiments, the composition of the soapstock used as a mixed lipid feedstock can vary depending on the crude natural oil from which it was derived. Table 1 shows the composition of various soapstocks used to practice methods and processes as provided herein, e.g., as described in U.S. Pat. No. 4,118,407.

TABLE 1

Composition of soapstocks from the refining of various natural oils

| Composition | Soy-bean | Cotton-seed | Coco-nut | Palm Kernel | Palm |
|---|---|---|---|---|---|
| Water | 57.3 | 58.6 | 66.8 | 57.8 | 66.4 |
| Neutral Oil | 14.6 | 13.0 | 17.4 | 26.2 | 8.4 |
| FFA | 1.46 | 0.94 | 0.55 | 0.24 | 1.25 |
| Unsaponifiable | 1.1 | 1.4 | 0.85 | 0.38 | 0.2 |
| Soap | 14.2 | 17.5 | 14.4 | 14.2 | 23.8 |
| Phosphatide | 11.34 | 8.56 | 0 | 0 | 0 |
| Phosphorus | 0.8 | 0.38 | 0.16 | 0 | 0 |
| Total FFA | 23.7 | 27.6 | 27.3 | 38.1 | 21.9 |
| pH | 9.5 | 9.5 | 9.2 | 9.2 | 10.8 |

Other mixed lipid feedstocks suitable for use in methods and processes as provided herein comprises tall oil soaps. Tall oil soaps are generated via the alkaline pulping of wood in the Kraft process. The alkaline pulping of wood using the Kraft process results in the production of black liquor, comprising the majority of the non-cellulose components of the wood. These products include hemicelluloses, lignin, and various salts of carboxylic acids including rosin salts and soaps (salts of fatty acids). After the black liquor is concentrated using multiple effect evaporators, it is allowed to settle or is centrifuged. As the concentrated black liquor settles, the soaps float to the surface where they are skimmed and removed. The skimmed product (referred to as black liquor soaps or tall oil soaps) can be used as a feedstock in various embodiments of processes and methods as provided herein.

In alternative embodiments, the mixed lipid feedstock used to practice methods and processes as provided herein comprises a saponified crude natural oil, e.g. a saponified vegetable oil. In alternative embodiments, the mixed lipid feed feedstock is a saponified castor oil, i.e. a composition comprising soaps derived from mixing a base with a castor oil, the saponifiable content in the castor oil, e.g. glycerides, and phospholipids, having been converted to soaps. The majority of the fatty acid content in castor oil (e.g. between 80 to about 95% of the fatty acid content) is ricinoleic acid (12-hydroxy-9-cis-octadecenoic acid). In alternative embodiments, provided are methods or processes for generating ricinoleic acid by thermal hydrolysis, acidulating the saponified castor oil to generate free fatty acids, and then separating or isolating ricinoleic acid from the generated free fatty acids.

Alternative embodiments of the methods and processes are described in greater detail below.

Thermal Hydrolysis:

In alternative embodiments, in thermal hydrolysis processes as provided herein, the mixed lipid feedstock is hydrolyzed and the reaction is driven by heat and pressure. The reaction mechanism includes the hydroxyl ion attacking the carbonyl group(s), or ester(s), present in mixed lipid feedstocks in the form of triglycerides, and/or phospholipids. When full reaction proceeds, the process yields fatty acids, glycerol, and other non-TFA solids due to the inherent nature of soapstock.

In alternative embodiments, the first stage of the process is a thermal hydrolysis reaction with a mixed lipid feedstock. In alternative embodiments, the thermal hydrolysis reaction can take place in any suitable reaction vessel known in the art. In alternative embodiments, the reaction can be a batch or continuous process, depending on the desired throughput of material from the reaction. In alternative embodiments, the process involves adding a mixed lipid feedstock to a reactor where thermal hydrolysis will occur.

In alternative embodiments, the thermal hydrolysis reaction is carried out at a temperature in the range of between about 20° C. to about 600° C., or in a range of between about 100° C. to 500° C., or about 200° C. to 400° C., or about 240° C. to 300° C., or at about 260° C. In alternative embodiments, the thermal hydrolysis reaction is carried out at a pressure of between about 500 to 2000 psig, between about 650 and 750 psig, between about 750 and 850 psig, between about 850 and 1000 psig, between about 1000 and 1500 psig, or between about 1500 psig and 1800 psig. In alternative embodiments, the thermal hydrolysis reaction is carried out at ambient pressure. In alternative embodiments, the time allotted for the reaction to occur is between about 1 minute and 300 minutes, e.g. between about 20 and 30 minutes, or between about 160 and 180 minutes, or between about 300 minutes and 500 minutes. In alternative embodiments, the amount of water in the thermal hydrolysis reaction is between about 2:1 water-to-total dissolved solids (TDS) present in the feedstock to about 15:1, e.g. about 10:1.

Acidulation of Soaps:

In alternative embodiments, the fatty acids, or the reaction product generated during the thermal hydrolysis step of the process is subjected to an acidulation step in which most, or substantially all, of the remaining soaps are acidulated to generate free fatty acids. The soaps are acidulated by mixing them, in any suitable reaction vessel, e.g. the same reaction vessel that was used in the thermal hydrolysis step, with an acid to form an acidulation reaction mixture.

In alternative embodiments, the acid is either an organic or inorganic acid, e.g. carbonic acid. In alternative embodiments, carbonic acid is generated by mixing $CO_2$ with the thermal hydrolysis reaction product, wherein the $CO_2$ reacts with the water (present in the thermal hydrolysis reaction product) to form carbonic acid. In alternative embodiments, the $CO_2$ is a liquid or a gas or a combination thereof. In an exemplary embodiment, when the $CO_2$ is a gas, the $CO_2$ is then piped or otherwise directed into the reaction vessel wherein the $CO_2$ reacts with the water present in the thermal hydrolysis reaction product to form carbonic acid. Once formed, the carbonic acid reacts with the soaps, thereby acidulating them and generating free fatty acids and a corresponding salt, e.g. sodium bicarbonate.

The amount of $CO_2$ used in the acidulation step of alternative embodiments of the process can vary depending on, for example, ambient temperature and pressure conditions, but is generally sufficient to increase the pressure of the reaction vessel in which the acidulation reaction is being carried out to between about 0 and about 2000 psig, e.g.

between about 10 and 1000 psig, about 20 to about 600 psig, about 30 to about 500 psig, about 40 to about 400 psig, about 50 to about 300 psig, about 60 to about 200 psig, about 60 to about 150 psig, about 70 to about 140 psig, about 80 to about 120 psig, about 90 to about 110 psig, or about 100 psig. In alternative embodiments, the acidulation reaction is carried out at a temperature in the range of between about 5° C. to about 400° C., e.g. about 10° C. to about 90° C., about 15° C. to about 70° C., about 20° C. to about 60° C., or about 25° C. to about 40° C.

In alternative embodiments, the source of the $CO_2$ used in the acidulation step is a "stack gas" or "flue gas" (used interchangeably herein and referred to as "stack gas") other source of gaseous $CO_2$ emitted from an industrial process or any oven, furnace, boiler, steam generator or the like, e.g. from a coal fired power plant, ethanol plant, brewery, or any other industrial process wherein a gaseous waste stream comprising $CO_2$ is emitted.

In alternative embodiments, the stack gas is piped or otherwise transferred from the emission source to the vessel in which the acidulation reaction is carried out. In alternative embodiments, the stack gas can comprise gaseous $CO_2$ and possibly other products depending on the filtration and other purification steps that the stack gas was subjected to prior to being transferred to the acidulation reactor. The exact composition of the stack gas will vary depending on the emission source and post-combustion processing steps but is generally comprised primarily of $CO_2$ (e.g. about 60% or more $CO_2$), nitrogenous products (e.g. $N_2O$ and $NO_2$), sulfur dioxide ($SO_2$), hydrogen sulfide ($H_2S$), water vapor and possibly other products.

In alternative embodiments wherein a stack gas is used as the $CO_2$ source, other products in the stack gas, e.g. $N_2O$, $NO_2$, $SO_2$, $H_2S$ or the like can react with the water in the acidulation reaction mixture to form their equivalent aqueous acid species (e.g., $SO_2$ would react with the water to generate sulfuric acid). The generation of additional acid products in the reaction mixture can serve to increase the reaction efficiency and reduce the total amount of time required to perform the acidulation reaction. As such, the use of a stack gas "waste stream" may be beneficial in the process, representing an opportunity to utilize a waste stream from one industrial process to benefit another industrial process (which might otherwise require expensive processing steps prior to being emitted) as an input for the present process. The process therefore is a means of diverting what would otherwise be an environmental pollutant to an input stream of a separate industrial process.

In alternate embodiments, the $CO_2$ can be liquid from a bulk tank or truck. Other products may optionally be added to the acidulation reaction mixture e.g. organic or inorganic acids, e.g. formic acid or sodium bisulfate. The addition of additional acids can be useful in tailoring the ash profile of the resulting acidulation product mixture (the mixture of products resulting from the acidulation reaction) such that certain end products can be used as, e.g. a fertilizer. The optional addition of additional acids can serve to increase the reaction efficiency by acidulating soaps that were not acidulated by the carbonic acid.

In alternative embodiments, the desired pH of the acidulation reaction mixture is less than about pH 5, or is between about pH 1 to pH 6, or is about pH 1, 2, 3, 4, 5 or 6. In alternative embodiments, the amount of $CO_2$ and optional other acids (e.g. from stack gas) added to the acidulation reaction mixture is sufficient to reduce the pH of the mixture to below 5 or about 2 or 3.

In alternative embodiments, flowing the addition of the $CO_2$ (or stack gas, or carbonated water) and optional other acids to the saponification (thermal hydrolysis) reaction product and after the reaction vessel has reached the desired temperature and pressure to carry out the acidulation step, the resulting reaction mixture is agitated, or otherwise mixed in order to maximize the contacting of the soaps with the carbonic acid (generated once $CO_2$ reacts with the water present in the saponification reaction mixture). The mixture can be agitated using any suitable method known in the art, e.g. a spinning blade mixer. In alternative embodiments, the mixture is agitated for between about 10 minutes to about 200 minutes, e.g. between about 25 minutes to about 150 minutes, or between about 20 minutes to about 60 minutes, or about 30 minutes.

In alternative embodiments, following the agitation step, the contents of the acidulation reaction vessel are allowed to settle, allowing for the formation of a lipid layer and aqueous layer. The lipid layer floats on the top of the aqueous layer. In alternative embodiments, the lipid layer comprises free fatty acids and any non-acidulated soaps, and the aqueous layer comprises, for example, water, glycerol, phosphate salts, sodium bicarbonate, smaller amounts of sodium carbonate (or other equivalent salts), unsaponifiable material e.g. waxes and sterols, and dissolved carbonic acid. In alternative embodiments, the lipid layer comprising the free fatty acids generated in the acidulation reaction is separated from the remaining reaction products. The separation technique used can be any suitable separation technique known in the art. In alternative embodiments, the reaction products of the acidulation step are transferred to a separation vessel, e.g. a decanter wherein the mixture is allowed to settle and allowed to separate, forming an aqueous phase and a "lipid" phase comprising the free fatty acids which floats on top of the aqueous phase. In alternative embodiments, the decantation procedure results in the formation of separate lipid and aqueous phases in approximately 1 hour or less, depending on the configuration of the reaction vessel. Other separation techniques, e.g. centrifugation, may also be used in accordance with the present invention. In certain embodiments, the acidulation product mixture is not transferred to a separate vessel in order to separate the lipids from the remaining reaction products. In such embodiments, the aqueous layer is drained from the bottom of the reaction vessel and the lipid layer is recovered as the reaction product.

In alternative embodiments, the reaction products generated during the acidulation reaction are transferred to the separation unit in such a way that the loss of any gaseous $CO_2$ is minimized, e.g. via the use of a liquid level control feedback or other suitable method.

In certain embodiments, after the acidulation reaction, the reaction vessel is depressurized, allowing for the dissolved carbonic acid to separate out of the solution as gaseous $CO_2$. In such embodiments, the captured $CO_2$ is recycled for use in the acidulation step.

In alternative embodiments, the process comprises multiple acidulation reactions e.g. between about 1 and 20, or about 1, 2, 3, 4, 5, 6, 7, 8, or 9 or more acidulation reactions. In such embodiments, following the first acidulation reaction as described above, the reaction vessel is depressurized and the $CO_2$ is captured and recycled. The lipid layer is then separated or otherwise removed from the aqueous layer, and water is added into the reaction vessel containing the lipid layer. $CO_2$ is then added to the reaction vessel until the desired pressure is reached as described above. The reaction vessel is then heated and agitated as previously described and allowed to settle. The resulting lipid layer is then separated or otherwise removed from the aqueous layer as previously described. The resulting lipid layer is then separated or otherwise removed and can optionally be subjected to additional acidulation reactions as previously described, wherein additional water and $CO_2$ is added and the resulting mixture agitated at the desired temperature and pressure and the resulting lipid layer is separated or otherwise removed from the aqueous layer. The number of acidulation reactions in the process can vary depending on the desired free fatty acid yield and process economics.

In certain embodiments, the number of acidulation reactions is sufficient to acidulate substantially all of the soaps present in the thermal hydrolysis product mixture, e.g. 1 to 8 acidulation reactions, e.g. 2 acidulation reactions.

In alternate embodiments, following the first acidulation reaction as described above, the reaction vessel is not depressurized and the $CO_2$ is allowed to remain in the pressure vessel. Instead, the aqueous layer is subsequently drained from the bottom of the reactor and recycled to be used in subsequent acidulation reactions where the $CO_2$ remains pressurized in the vessel.

In alternative embodiments, a salt, e.g. sodium chloride or other equivalent salt, is added to the product mixture following an acidulation reaction. The addition of NaCl or equivalent salt to the acidulation reaction product increases the ionic strength of the product mixture and prevents the lipid layer from emulsifying with the aqueous layer. In certain embodiments, the process comprises one or more acidulation reactions and the salt, e.g. NaCl, is added to the product mixture generated by the first acidulation reaction. In certain embodiments, the process comprises two or more acidulation reactions, e.g. six acidulation reactions, and the salt is added to the product mixture generated by the third acidulation reaction.

The acidulation reaction, or multiple acidulation reactions, can take place in any suitable reaction vessel known in the art. In alternative embodiments, the reaction can be a batch or continuous process, depending on the desired throughput of material from the reaction. In embodiments of the process comprising multiple acidulation reactions, the multiple acidulation reactions can take place in the same reaction vessel or in separate reaction vessels. In embodiments comprising multiple acidulation reactions taking place in multiple reaction vessels, the lipid layer generated during each acidulation reaction is separated or otherwise removed from the corresponding aqueous layer and transferred to a separate reaction vessel wherein the lipid layer is mixed with water and $CO_2$ and the resulting mixture is agitated for the desired period under the desired temperature and pressure conditions and allowed to settle in order to generate a new lipid layer.

In alternative embodiments, the separated free fatty acids generated in the acidulation reaction are subjected to further processing steps. In alternative embodiments, the free fatty acids are further separated by their carbon chain length, i.e. the number of carbon atoms contained in the aliphatic tail portion of the free fatty acid, which can comprise, in alternative embodiments, between 4 and 28 carbon atoms. In alternative embodiments, the free fatty acids are separated by their saturation. In alternative embodiments, the saturated free fatty acids are separated from the unsaturated free fatty acids. In alternative embodiments, the separated free fatty acids are separated into short-chain fatty acids (aliphatic tail length of fewer than 6 carbon atoms), medium-chain fatty acids (aliphatic tail lengths of between 6 and 12 carbon atoms), long-chain fatty acids (aliphatic tail length of between 13 and 21 carbon atoms), and very long-chain fatty acids (aliphatic tail length of 22 or more carbon atoms). In alternative embodiments, the separated free fatty acids are separated into individual fatty acids streams based on the length (number of carbon atoms) of their aliphatic tails.

In alternative embodiments, the separated free fatty acids can be further separated into distinct cuts, based on their aliphatic tail length and/or saturation, using any suitable technique known in the art, e.g. ion exchange, continuous ion exchange, chromatography, continuous chromatography or the like.

In alternative embodiments, the thermal hydrolysis reaction and the acidulation reaction take place sequentially; or, the thermal hydrolysis reaction and the acidulation reaction can take place simultaneously, e.g., as in a "one pot" reaction in one reaction vessel.

Electrolysis of Lipid Phase from Acidulation Reaction:

In alternative embodiments, the lipid phase having been separated in the foregoing acidulation reaction(s) comprises a small percentage of unreacted soaps, for example, soaps that were not acidulated to generate free fatty acids, e.g., between about 5 wt % and 30 wt %, or about 10 wt % of the lipid phase. In order to increase the overall efficiency of the process, alternative embodiments of the process comprise an electrolysis step wherein the lipid phase comprising a small amount of unreacted soaps is transferred to an electrolysis unit wherein the soaps in the lipid are reacted with an anolyte to generate free fatty acids. In alternative embodiments, the addition of the electrolysis step converts substantially all, e.g., 90%, 95%, 98% or more of the unreacted soaps to free fatty acids.

In alternative embodiments comprising the electrolysis step, the lipid layer from the acidulation reaction(s) is transferred to an electrolysis unit (e.g. a hydrogen evolving cathode (HEC) electrolysis unit) comprising a vessel or suitable container comprising an anode (the anode vessel) and a vessel or other suitable container comprising a cathode (the cathode vessel) separated by a selective filtration membrane, e.g. a polytetrafluoroethylene (PTFE) membrane. In alternative embodiments, the anode is comprised of a mixed metal oxide (MMO) layer coated onto a stable metal substrate, e.g. titanium. In alternative embodiments, the cathode can be, for example, titanium or a Monel alloy (a nickel alloy primarily composed of nickel (up to 67%) and copper), or any other substrate that is stable in a reducing environment.

In alternative embodiments, a solution comprising an anolyte is added to the anode vessel. In alternative embodiments the anolyte is a sodium and/or potassium salt, e.g. sodium or potassium sulfate (for illustrative purposes, sodium sulfate is the anolyte in the remaining description of the electrolysis step, although those skilled in the art would appreciate that an equivalent anolyte such as potassium sulfate may be substituted in the process). Simultaneously, the cathode vessel is filled with a catholyte, e.g. sodium hydroxide. In alternative embodiments, a current is passed through the electrolysis unit resulting in the oxidation of the sodium sulfate, thereby generating sodium ions and sodium bisulfate. The current also can serve to oxidize the water, generating hydrogen ions. The generated sodium ions are pushed across the electrolysis membrane and the generated sodium bisulfate results in a reduction of the pH of the anolyte solution to, e.g. about 3. Once the pH has reached a suitable level, e.g. about 3, a portion of the separated lipid from the acidulation step can be introduced into the vessel with the anolyte solution wherein any unreacted soaps in the lipid layer react with the sodium bisulfate to generate free fatty acids and sodium sulfate. The generated free fatty acids can be separated from the anode vessel by any suitable method in the art, e.g. through a pipe at the top of the anode vessel and into separate side tank. The generated sodium sulfate acts as the regenerated anolyte which, after the fatty acids have been removed from the anode vessel, and can be oxidized by passing a current through the anode. As such, the electrolysis unit operates in a semi-continuous fashion, wherein sodium sulfate is oxidized to generate sodium bisulfate, thereby lowering the pH of the anolyte solution. In alternative embodiments, once the pH has reached a suitable level, e.g. about 3 additional lipid material from the acidulation reaction step is added, and the soaps present in the lipid material react with the sodium bisulfate to generate free fatty acids and sodium sulfate.

In alternative embodiments, as the electrical current is passed through the cathode, the water is reduced, thereby generating hydroxide ions. As the sodium ions are pushed across the membrane from the anode vessel into the cathode vessel, they react with the generated hydroxide ions to generate sodium hydroxide. In alternative embodiments, the starting concentration of the catholyte (sodium hydroxide) can be about 30 wt %. As additional sodium hydroxide can be generated (from the sodium ions moving across the membrane and into the cathode and reacting with the hydroxide ions), the concentration of sodium hydroxide can be increased to, e.g. about 33 wt %, before some of the sodium hydroxide is removed to bring the concentration back down to its original concentration, e.g. 30 wt %. The generated sodium hydroxide solution comprising sodium hydroxide and water can be recycled, or sold as a value added product.

In alternative embodiments, the electrolysis unit is a hydrogen evolving cathode (HEC) unit with a current density in the range of about 1-10 kA/m$^2$. In alternative embodiments, the voltage of the individual cells of the unit can be in the range of between about 3 and 15 volts. In alternative embodiments, the unit comprises holding tanks for the anolyte and catholyte for electrolyte balancing as the process is carried out. In alternative embodiments, the holding tank of the catholyte also serves as the additional tank for the lipid product, as well as a decanter for separating fatty acids generated in the process. In alternative embodiments, upon startup of the electrolysis unit, the sodium sulfate anolyte is electrolyzed, causing the pH of the anolyte solution to drop from, e.g. about 7 to about 3 to 3.5, and the temperature of the anode vessel is increased to between about 40 to 90° C., or above the melting point of the lipid solution entering the anode. In alternative embodiments, the lipid product is added to the anolyte solution until the pH increases to, e.g. about 4.5, after which point the addition of the lipid product is halted. In alternative embodiments, once the anolyte is electrolyzed, it contacts the soaps, which float in the holding tank/decanter due to limited solubility in the anolyte. Once the pH in the anolyte solution is reduced to 3-3.5, the circulating pump halts and fatty acids can be decanted from the anolyte for downstream processing.

In alternative embodiments, the foregoing electrolysis procedure is used as a total replacement of the acidulation reaction comprising acidulating soaps using carbonic acid. In such embodiments, the thermal hydrolysis product mixture generated in the thermal hydrolysis reaction is subjected to electrolysis as described above, wherein the product entering the anode vessel of the electrolysis unit is the thermal hydrolysis product mixture rather than the lipid layer separated from the acidulation product mixture.

Treatment of Aqueous Phase from Acidulation Reaction:

Evaporation/Drying

In alternative embodiments, the aqueous phase(s) generated in the one or more acidulation reactions is subjected to one or more processing steps in order to recover desirable reaction products that remain in the aqueous phase of the acidulation reaction products and/or to treat the aqueous phase such that the resulting product meets or exceeds relevant regulatory standards relating to animal feed additives.

In alternative embodiments, the aqueous phase, or multiple aqueous phases (i.e. collected from acidulation reactions) is treated to remove water, e.g. by any suitable drying method (e.g. evaporation via falling film, forced recirculation flashing, or any other suitable method) known in the art, thereby generating a product comprising sodium bicarbonate. Care must be taken so as not to convert sodium bicarbonate to sodium carbonate via thermal degradation, so evaporation temperature should be conducted below about 60° C. and should be conducted under a vacuum.

In alternative embodiments, once a majority of the water has been removed from the aqueous stream(s), the resulting product can be dried further to generate a sodium bicarbonate product that is substantially free of any water, e.g. less than about 20% water or less than about 10% water. Suitable apparatuses for creating a substantially dry sodium bicarbonate product include fluidized bed dryers, lyophilizers, spray dryers, and rotary drum dryers. The generated dried sodium bicarbonate product can be used in any application that utilizes a crude sodium bicarbonate stream, e.g. as an animal feed additive.

Filtration

In alternative embodiments, the aqueous phase(s) generated in the one or more acidulation reactions is subjected to one or more processing steps in order to recover desirable reaction products that remain in the aqueous phase of the acidulation reaction products and/or to treat the aqueous phase such that the resulting product meets or exceeds relevant regulatory standards relating to wastewater. In alternative embodiments, the aqueous phase(s) generated during one or more acidulation reactions can comprise various organic molecules and salts in addition to water. The exact composition of the aqueous phase(s) will vary depending on the feedstock used in the process, as well as other process variables, e.g. the reaction conditions, separation technique to separate the lipid phase from the aqueous phase during the acidulation process, etc. In alternative embodiments, the aqueous phase(s) may include, in addition to water: sodium bicarbonate (or equivalent salt), glycerol, phosphates, cholines, ethanolamines, sodium sulfate (or equivalent salt), inositol, unreacted saponifiable material, e.g. soaps and/or glycerides, residual (small amounts of) free fatty acids, other organic or inorganic compounds, or any combination thereof.

The composition of an exemplary aqueous phase generated in the acidulation step comprising 6 acidulation reactions, wherein the feedstock of the process is a soapstock obtained from the processing of a crude soybean oil, is described below:

| | |
|---|---|
| Water | 92.8% |
| Sodium sulfate | 1.4% |
| Glycerin | 0.79% |
| Choline | 0.06% |
| Ethanolamine | 0.02% |
| Inositol | 0.05% |

| | |
|---|---|
| Phosphate | 0.12% |
| Sodium bicarbonate | 4.72% |

In alternative embodiments, the aqueous phase(s) may be treated using filtration, e.g. a size-exclusion filtration system. In alternative embodiments, the filtration step may be operationally in-line (i.e. continuously) with the acidulation step such that aqueous phase generated in each acidulation reaction (if the embodiment comprises more than one acidulation reaction) is treated immediately after or during the point at which the aqueous phase is separated from the lipid phase. In other embodiments, the aqueous phases may be collected and treated in a single batch.

In alternative embodiments, wherein the process comprises multiple acidulation reactions, the aqueous phase generated in each of the acidulation reactions is continuously pumped through a filtration mechanism, e.g. a nano- or microfiltration system or other appropriate membrane filtration system which may be selected from any of the known nano-, micro- or other appropriate size-exclusion filtration mechanisms or systems known in the art. In alternative embodiments, the size of the pores of the filter allows for the rejection (i.e. allows the particles to pass through the membrane) of certain particles, e.g. soaps and/or phosphates, and retains (i.e. does not allow the particles to pass through the membrane) the sodium bicarbonate (or other equivalent salt). In alternative embodiments, the particles that pass through the membrane of the filter have a molecular weight less than the molecular weight of sodium palmitate, e.g. sodium bicarbonate, sodium phosphates, etc. In alternative embodiments, rejected particles are sodium (or other equivalent) soaps, e.g. sodium palmitate, sodium oleate, etc. In alternative embodiments, the filtration system provides for a more efficient process in that the soaps and/or other saponifiable material rejected by the membrane of the filter are returned to the lipid phase for subsequent acidulation reactions, thereby increasing the overall fatty acid yield of the process.

In alternative embodiments, the addition of a filtration step in the process serves to drive the acidulation reaction to completion by removing the sodium bicarbonate (or other equivalent salt) from the acidulation product. Sodium bicarbonate can "back-react" with the fatty acids generated in the acidulation step, wherein some of the fatty acids react with the sodium bicarbonate to generate soaps, thereby lowering the overall fatty acid yield of the process. By removing the generated sodium bicarbonate from the acidulation products, the opportunity for back-reacting with the sodium bicarbonate is diminished and the fatty acid yield of the process is increased.

In alternative embodiments, the filtration step is carried out in a pH range of between about 6 and 11 and a pressure of between about 50 and 800 psi, while maintaining a temperature of between about 23 and 100° C. In alternative embodiments, the pH of the acidulation product solution on which the filtration step is carried out varies depending on the amount of sodium bicarbonate in the solution. As the sodium bicarbonate is removed, e.g. via filtration, the pH drops and becomes increasingly acidic, thereby driving the acidulation reaction to completion. In alternative embodiments, the aqueous phase of the acidulation reaction(s) is pumped through the filter at a range of between about 1 and 100 gallons per minute. In alternative embodiments, the size of the pores in the filter membrane has a molecular weight cutoff (MWCO) of between about 100-250 Daltons.

In alternative embodiments, the retained portion of the aqueous phase comprising the sodium bicarbonate (or other equivalent salt if sodium hydroxide was not used in the saponification reaction step) is then subjected to a concentration step using, for example, reverse osmosis (RO). In alternative embodiments, the conditions for the RO step are similar to those of the filtration step, i.e. a pH in the range of between about pH 6 and pH 11, a pressure of between about 50 psi and 800 psi, while maintaining a temperature of between about 23° C. and 100° C. In alternative embodiments, the concentrated sodium hydroxide can be discarded or sold, increasing the overall efficiency of the process. In alternative embodiments, the water produced in the RO step is suitably pure to be recycled within the acidulation step, thereby increasing the efficiency of the process and reducing total water consumption.

Lime Treatment and Oxidation of Organics

In alternative embodiments, the aqueous phase generated in the acidulation reaction, or multiple acidulation reactions, is collected and contacted with calcium hydroxide, i.e. slaked lime. The amount of lime added to the aqueous phase is generally an amount sufficient to increase the pH of the solution to about 11. The lime-treated aqueous phase is allowed to react for a period of between about 1 and 24 hours. During the reaction time, various precipitates form and the pH of the solution increases to about 12 or 13.

In the same lime-contacting step described above, various calcium precipitates are formed when they react with various components in the aqueous phase. These precipitates can include, for example, various calcium phosphates (i.e. $Ca_x(PO_4)_x$). Other components of the lime-treated aqueous phase can include, for example, those products that were present in the recovered aqueous phase of the one or more acidulation reactions that did not react with the lime, e.g. glycerol, ethanolamines, choline, other organics, or any combination thereof.

In order to satisfy the Biochemical Oxygen Demand requirements for conventional wastewater treatment facilities, in alternative embodiments, the lime-treated aqueous phase product may be subjected to an oxidation step in which the organics present in the solution, e.g. phosphorous, glycerin, and other organics are fully oxidized into gaseous products that precipitate out of solution. In alternative embodiments, the lime-treated aqueous phase is subjected to Fenton oxidation wherein hydrogen peroxide and $Fe^{2+}$ ions are used to catalyze OH radical formation. In alternative embodiments, the Fenton oxidation step is carried out by adding between about 1 and 10 grams of hydrogen peroxide per liter of aqueous phase liquid and between about 0.1 and 1.0 mol $Fe^{2+}$ per mol of hydrogen peroxide to the lime-treated aqueous phase. The resulting mixture is then allowed to react for between about 1 and 24 hours at a temperature of between about 20-50° C. Once the hydrogen peroxide and $Fe^{2+}$ are added to the lime-treated aqueous phase, the pH will drop rapidly to between about 3 and 9, e.g. less than pH 7. The pH then rises slowly as the organics are gasified and leaves the solution. The reaction is considered complete when the rate of change in the pH of the solution is less than about 0.1 units/hour. UV oxidation can optionally be used in combination with Fenton oxidation.

In alternative embodiments, following the oxidation step, the solution is then contacted with fresh lime to precipitate any unbound phosphorus and other acidic species. The conditions for the second lime treatment step are identical to those of the first lime treatment step.

Electrolysis of Aqueous Phase

In alternative embodiments, the aqueous phase is subject to electrolysis to recover monovalent ions as a base for a value added product. In alternative embodiments, as the electrical current is passed through the cathode, the water is reduced, thereby generating hydroxide ions. As the monovalent ions, e.g. sodium or potassium, are pushed across the membrane from the anode vessel into the cathode vessel, they react with the generated hydroxide ions to generate the corresponding hydroxide base, e.g. sodium hydroxide or potassium hydroxide, which can be recovered and sold as a value added product.

The invention will be further described with reference to the examples described herein; however, it is to be understood that the invention is not limited to such examples.

EXAMPLES

Example 1: Thermal Hydrolysis and Acidulation of Mixed Lipid Feedstock

This example describes an exemplary protocol of the invention:

A mixed lipid feedstock comprised of soapstock, glycerides, and phospholipids was obtained from an oil refining facility. The mixed lipid feedstock was added to a vessel and subject to thermal hydrolysis to free the fatty acids from their glycerol backbones and phosphate groups. The lipid product resulting from the thermal hydrolysis reaction was then subjected to a first acidulation reaction wherein $CO_2$ was introduced into the reaction vessel comprising the lipid product. The $CO_2$ reacted with the water in the lipid product to form carbonic acid and acidulated soaps, thereby generating an acidulation reaction product comprising a first lipid layer of free fatty acids and an aqueous layer comprising water glycerol, sodium bicarbonate, unsaponifiable material, e.g. waxes and sterols, dissolved carbonic acid, and phosphate salts.

Feedstock Description:

The feedstock used in the present example was a mixed soapstock obtained from a natural oil refinery. Water was added to the mixed feedstock to ensure a ratio of 5:1 water-to-total dissolved solids (TDS), or water:TDS. The mixture was then added to an autoclave (e.g., a Parr) reactor where thermal hydrolysis was performed. The total mass added to the 2 L autoclave (e.g., Parr) reactor was 1.4 kg of feedstock material and water.

Composition of Feedstock:

55 gallons soy soapstock (Archer Daniels Midland, Chicago, Ill.); Makeup: 24.7 wt % TDS (Soaps, saponifiable material, and unsaponifiable material), 15.9 wt % free fatty acids (64% dry TFA based on TDS) and 46.14 wt % water.

Thermal Hydrolysis Reaction:

Thermal hydrolysis reaction: Nitrogen gas was used to purge the reactor of air once the feedstock was added. This was repeated 5 times to guarantee the air had been purged from the reactor. The reactor temperature was set to 270° C. which allowed thermal hydrolysis to occur. Agitation was set to approximately 60 rpm to allow minimal movement. The temperature was held at 270° C. for 30 minutes. The reactor was then allowed to cool to 90° C. and a post-thermal hydrolysis sample was acquired from the bottom of the reactor.

Acidulation Reaction:

Acidulation reaction: After the thermal hydrolysis reaction, $CO_2$ was slowly introduced, e.g., over a period of about 8, 9 or 10 minutes or more, into the sealed reaction vessel through a port located near the bottom of the vessel. $CO_2$ was continually added to the reaction vessel until the pressure inside the vessel reached 300 psig. The reaction vessel was maintained at a temperature of 90° C. and agitated using a spinning blade mixer spinning at 400 rpms for a period of 30 minutes. After 30 minutes, the contents of the reaction vessel were allowed to settle for 10 minutes. During settling, a lipid layer and an aqueous layer formed and the lipid layer floated on top of the aqueous layer. The aqueous layer was drained from the bottom of the reaction vessel.

Second acidulation reaction: After the aqueous layer was removed following the first acidulation reaction, the reaction vessel was not depressurized. The contents in the reaction vessel were agitated using the spinning blade mixer as 95 parts fresh water (based on 100 parts of the first aqueous fraction) was simultaneously introduced through the top of the reaction vessel. The reaction vessel was maintained at a temperature of 90° C. and agitated using the spinning blade mixer at 400 rpms for a period of 30 minutes. After 30 minutes, the contents of the reaction vessel were allowed to settle for 10 minutes. During settling, a lipid layer and an aqueous layer formed and the lipid layer floated on top of the aqueous layer. The aqueous layer was drained from the bottom of the reaction vessel.

Analysis of FFA Content and FFA Profile:

Following the second acidulation reaction, a sample of the hexane layer comprising the free fatty acids (FFAs) was removed from the reaction vessel for analysis. First, the hexane was removed from the sample. Using acid titration, it was determined that the fatty acid content of the sample was 91 wt % FFA (normalized based on FFA & soap). The remainder of the sample was comprised of soaps and various unsaponifiable material. The fatty acid profile of the sample is shown is Table 2.

TABLE 2

| Fatty acid profile of sample | | | |
|---|---|---|---|
| C16 | C18 | Other FFAs | Monos, di-acids, etc. |
| 19% | 79% | <1% | ≤1% |

Example 2: Electrolysis of Lipid Phase from Acidulation Reaction

Materials:

Two one liter working solutions in 2 L glass beakers with stirbars on 1000 W hotplates being recirculated by constant flow rate peristaltic pumps @ 60° C. (anolyte is saturated aqueous sodium sulfate and catholyte is 10 wt % sodium hydroxide); 5 cm$^2$ NAFION 115™ membrane, PVC body and tubing, 6"×1" DSA, 6"×1" Monel 400 cathode.

Using 0-30 V 0-20 A DC power supply, turn power supply on to provide constant amperage of 3 A to electrodes in PVC system. Pump anolyte and catholyte around with their respective peristaltic pumps at 750 mL/min and heat both to 60° C. Reduce anolyte (side with $Na_2SO_4$ solution) pH to about 3 to 3.5 before slowly adding enough saponified soapstock to increase pH of anolyte to 5. Stop addition of saponified soapstock and allow electrochemical cell to reduce anolyte pH back to about 3 to 3.5 before adding more saponified soapstock. Halt cycle once 60 minutes of run time has been reached and perform extraction of floating fatty material with nonpolar solvent. A rotary evaporator (or rotavap/rotovap) solvent from crude fatty phase to obtain anhydrous material for characterization.

Result: 12 g fatty material, 1 wt % soap, 99 wt % FFA via titration.

Total energy usage: 1740 kWhr/metric ton FFA produced.

REFERENCES

Asbeck, Lutz Signard, et al., Patent EU 0406945A2. 1 Sep. 1991.
Beal, R. E., et al., *J Am Oil Chem Soc Journal of the American Oil Chemists' Society* 49.8 (1972): 447-50.
Berry, William W., et al. Patent US 2016201010A1. 14 Jul. 2016.
Bills, Alan M. Acidification of Tall Oil Soap. Westvaco Corporation, assignee. U.S. Pat. No. 3,901,869. 26 Aug. 1975.
Bin, Wu et al. Patent CN 101565654 A. 28 Oct. 2009.
Bloomberg, Fritiof M., and Thomas W. Hutchins. Soapstock Acidulation. Arkansas Grain Corp, assignee. U.S. Pat. No. 3,425,938 A. 9 Jun. 1967.
Brister, Bryan Cole. U.S. Pat. No. 2,812,343. 5 Nov. 1957.
Dayton, Chris, and Flavio Galhardo. "Enzymatic Degumming." *Green Vegetable Oil Processing* (2014): 107-45.
Deng, Qi, Qunhui Wang, Qi Wang, Qifei Huang, and Pinghe Yin. "Study on Saponification Technology of Waste Edible Oil." 2009 *3rd International Conference on Bioinformatics and Biomedical Engineering* (2009).
Dowd, Michael K. *Journal of Chromatography A* 816.2 (1998): 185-93.
Dumont, Marie-Josée, and Suresh S. Narine. "Characterization of Soapstock and Deodorizer Distillates of Vegetable Oils Using Gas Chromatography." *Lipid Technology* 20.6 (2008): 136-38.
Dumont, Marie-Josée, et al., *Food Research International* 40.8 (2007): 957-74.
Echim, Camelia, et al., *Energy & Environmental Science Energy Environ. Sci.* 2.11 (2009): 1131.
Eyal, Aharon et al. Soapstock Treatment. Cargill Incorporation, assignee. Patent WO 2005095565A1. 13 Oct. 2005.
Fardell Jr., William G. Recovery of Crude Tall Oil. Westvaco Corporation, assignee. U.S. Pat. No. 4,075,188. 21 Feb. 1978.
Fizet, Christian. Process for Tocopherols and Sterols from Natural Sources. Hoffmann-La Roche Inc, assignee. U.S. Pat. No. 5,487,817. 30 Jan. 1996.
Geier, Douglas F., et al., U.S. Pat. No. 7,705,170B2. 27 Apr. 2010.
Haas, Michael J. *Fuel Processing Technology* 86.10 (2005): 1087-096.
Haas, Michael J., et al., U.S. Pat. No. 6,855,838B2. 15 Feb. 2005.
Haas, Michael J., et al., *Energy & Fuels Energy Fuels* 15.5 (2001): 1207-212.
Haas, Michael J., et al., *Journal of the American Oil Chemists' Society J Amer Oil Chem Soc* 77.4 (2000): 373-79.
Hangx, S. J. T. *Subsurface Mineralisation: Rate of CO2 Mineralisation and Geomechanical Effects on Host and Seal Formations*. Tech. Utrecht University: HPT Laboratory, Department of Earth Sciences, December 2005.
Huibers, Derk T A, et al., U.S. Pat. No. 5,283,319. 1 Feb. 1994.
Huibers, Et Al. Improved Acidification of Tall Oil Soap Using Carbon Dioxide. Union Camp Corporation, assignee. Patent WO 93/23132. 25 Nov. 1993.
Jin, B., et al., *Fuel Processing Technology* 89.1 (2008): 77-82.
Kulkarni, B. M., B. G. Pujar, and S. Shanmukhappa. "Investigation of Acid Oil as a Source of Biodiesel." *Indian Journal of Chemical Technology* 15 (2008): 467-71.
Morgan, William Douglas. WO 2009/017957 A1. 5 Feb. 2009.
Morren, John E. U.S. Pat. No. 3,428,660 A. 20 Jan. 1964.
Neiss, Oskar. U.S. Pat. No. 2,033,732 A. 27 Aug. 1934.
Phillips, C. Frank, U.S. Pat. No. 4,100,181. 11 Jul. 1978.
Reaney, Martin J. T. Patent US 2002009785A1. 24 Jan. 2002.
Red, Jerry F. P., et al., U.S. Pat. No. 4,118,407. 3 Oct. 1978.
Santos, Regiane Ribeiro Dos, et al., *Journal of Food and Nutrition Research JFNR* 2.9 (2014): 561-66.
Shelley, Arthur, et al., Patent US20050255174 A1. 17 Nov. 2005.
"Sodium Bicarbonate." *BicarZ*. Solvay, n.d. Web. 14 Apr. 2015. <http://www.bicarz.com/en/sodium-bicarbonate/bicar-z-properties/buffer-effect/index.html>.
Sutterlin, William Rusty, et al., Patent WO 2016100944A2. 18 Dec. 2015.
United States. Department of Agriculture. National Organic Program. *Tall Oil—Crop Production.* 2010.
Watanabe, Yomi, et al., *Journal of the American Oil Chemists' Society J Am Oil Chem Soc* 84.11 (2007): 1015-021.
Woerfel, J. B. "Processing and Utilization of By-products from Soy Oil Processing." *J Am Oil Chem Soc Journal of the American Oil Chemists' Society* 58.3 (1981): 188-91.
Woerfel, J. B. "Alternatives for Processing of Soapstock." *J Am Oil Chem Soc Journal of the American Oil Chemists' Society* 60.2 (1983): 310-13.
Zhiyuan, Dai et al. Patent CN 103992883. 20 Aug. 2014.

While the forgoing written description of the invention enables one of ordinary skill to make and use what is considered presently to be the best mode thereof, those of ordinary skill will understand and appreciate the existence of variations, combinations, and equivalents of the specific embodiments, methods, and examples herein. The invention should therefore not be limited by the above described embodiments, methods and examples, but by all embodiments and methods within the scope and spirit of the invention. A number of embodiments of the invention have been described. Nevertheless, it can be understood that various modifications may be made without departing from the spirit and scope of the invention. Accordingly, other embodiments are within the scope of the following claims.

What is claimed is:

1. A method for generating free fatty acids from a soap comprising a mixed lipid feedstock using a thermal hydrolysis reaction followed by acidification, the method comprising:
   (a) providing an aqueous solution or an aqueous mixture comprising a soap, and a mixed lipid feedstock comprising a saponifiable material;
   (b) heating and pressurizing the aqueous solution or mixture comprising the soap and the mixed lipid feedstock in a thermal hydrolysis reaction under conditions comprising sufficient pressure and temperature to hydrolyze substantially all bound fatty acids from their respective glyceride backbones or from their glyceride phosphate backbones to generate free fatty acids and glycerol or glycerol phosphate,
   thereby generating a first reaction product comprising a plurality of free fatty acids, or free fatty acids and unreacted soaps wherein the thermal hydrolysis reaction is carried out at under conditions comprising:
(1) a temperature in the range of between about 100° C. to about 600° C.,
(2) a pressure of between about 300 to about 2000 psig, or about 20.7 bar to about 137.9 bar, or a pressure of between about 1400 psi to about 3000 psi and
(3) a reaction time of between about 1 second (sec) to about 3000 minutes (min), and
(c) acidifying the first reaction product in an acidification or acidulation reaction, after the thermal hydrolysis reaction, comprising:
(1) cooling the first reaction product in a reaction vessel, or allowing the first reaction product to cool; and
(2) adding to the first reaction product a stack gas or a $CO_2$ gas, thereby increasing pressure in the reaction vessel, optionally mixing or agitating the stack gas or the $CO_2$ gas with the first reaction product, to generate a second, or acidification or acidulation, reaction mixture,
wherein the second reaction mixture is combined or mixed with the stack gas or the $CO_2$ gas for a sufficient amount of time to acidulate the soap in the second reaction mixture to generate a second reaction mixture product comprising free fatty acids, and bicarbonate or carbonate salt if $CO_2$ is used.

2. The method of claim 1:
(a) wherein the pH of the acidification or acidulation reaction mixture is less than about pH 5, or is between about pH 1 to pH 6, or is about pH 1, 2, 3, 4, 5 or 6;
(b) wherein the amount of the $CO_2$ or stack gas is sufficient to increase the pressure of the reaction vessel in which the acidification or acidulation reaction is being carried out to between about 300 to about 2000 psig;
(c) wherein the saponifiable material comprises: a soapstock, a triglyceride; a glyceride or a phospholipid;
(d) wherein the mixed lipid feedstock further comprises a washwater comprising soaps or a combination thereof, optionally generated during the chemical refining of a crude natural oil;
(e) wherein the mixed lipid feedstock is derived from: a biomass; a natural oil, wherein optionally the natural oil comprises a crude natural oil; or, a plant or an animal source, wherein optionally the mixed lipid feedstock from the animal source comprises a tallow;
(f) wherein the mixed lipid feedstock is derived from enzymatic degumming of edible and inedible oils;
(g) further comprising mixing the second reaction mixture product with an alcohol to form a third reaction mixture comprising fatty acid alkyl esters,
wherein optionally the mixing is done under conditions comprising between about 240° C. to about 350° C., or 200° C. to 400° C., and a pressure of between about 1400 psi to about 3000 psi,
and optionally substantially all of the free fatty acids are esterified to generate fatty acid alkyl esters, optionally, fatty acid methyl esters,
and optionally the alcohol comprises methanol, ethanol or a mixture thereof; or
(h) further comprising separating, isolating, and/or purifying the free fatty acids and/or the fatty acid alkyl esters into separate fractions.

3. The method of claim 2, wherein the natural oil comprises a vegetable oil,
wherein optionally the vegetable oil comprises a soybean oil, a canola oil, a rapeseed oil, a corn oil, a rice oil, a sunflower oil, a peanut oil, a sesame oil, a palm oil, an algae oil, a jatropha oil, a castor oil, a safflower oil, a grape seed oil or any combination thereof,
and optionally the natural oil or crude natural oil comprises castor oil, and optionally a free fatty acid generated is ricinoleic acid (12-hydroxy-9-cis-octadecenoic acid).

4. The method of claim 1, wherein the mixed lipid feedstock further comprises a phospholipid and/or an unsaponifiable material.

5. The method of claim 1, wherein the second, or acidification or acidulation, reaction mixture comprises carbonic acid,
and optionally a source of the carbon dioxide ($CO_2$) gas comprises a stack gas or a flue gas, or a gaseous $CO_2$ emitted from an industrial process or an oven, a furnace, a boiler, a steam generator, a coal fired power plant, an ethanol plant, a brewery, or an industrial process wherein a gaseous waste stream comprising $CO_2$ is emitted.

6. The method of claim 1, wherein the heating and pressurizing of the mixed lipid feedstock is done in a single vessel, or sequential, different, reaction vessels.

7. The method of claim 1, wherein:
the mixed lipid feedstock comprises, or further comprises, one or more compounds produced as a byproduct from the water washing of crude biodiesel,
wherein optionally the compounds comprise soapstock, monoglycerides, diglycerides, triglycerides and/or fatty acid alkyl esters or any combination thereof.

8. The method of claim 1, wherein the heating and pressurizing of the mixed lipid feedstock in the thermal hydrolysis reaction of step (b)(1) comprises:
(a) a temperature in a range of between about 100° C. to 500° C.; and/or
(b) a pressure of between about 650 and 750 psig; or
(c) a reaction time of between about 20 and 30 minutes, or between about 160 and 180 minutes, or between about 300 minutes and 500 minutes.

9. The method of claim 1, wherein the amount of the stack gas or the $CO_2$ gas is sufficient to increase the pressure of the reaction vessel in which the acidification reaction is being carried out to between about 10 and 1000 psig, about 20 to about 600 psig, about 30 to about 500 psig, about 40 to about 400 psig, about 50 to about 300 psig, about 60 to about 200 psig, about 60 to about 150 psig, about 70 to about 140 psig, about 80 to about 120 psig, about 90 to about 110 psig, or about 100 psig.

10. The method of claim 1, wherein the acidification or acidulation reaction is carried out at a temperature in the range of between about 5° C. to about 400° C., optionally about 10° C. to about 90° C., about 15° C. to about 70° C., about 20° C. to about 60° C., or about 25° C. to about 40° C.

11. The method of claim 1, wherein:
an acid or acid solution is added to the acidification or acidulation reaction, and optionally the acid or acid solution comprises an organic acid, an inorganic acid, a mineral acid, a hydrochloric acid, a sulfuric acid, a formic acid or sodium bisulfate,
and optionally when a stack gas comprising $N_2O$ is used, the acid or acid solution comprises, or further comprises in addition to $CO_2$, $NO_x$, and optionally the $NO_x$ comprises $NO_2$, and optionally when a stack gas comprising $SO_x$ is used, optionally wherein the $SO_x$ is $SO_2$, or optionally when a stack gas comprising $H_2S$ is used, the $N_2O$, $NO_x$, $SO_x$, or $H_2S$ reacts with water in the acidification reaction mixture to form equivalent aqueous acid species.

12. The method of claim 1, wherein:
(a) a solvent added to the thermal hydrolysis reaction is a polar solvent,
(b) the polar solvent of step (a) comprises an alcohol solvent, wherein optionally the alcohol solvent comprises a methanol solvent,
(c) the solvent added to the thermal hydrolysis reaction is a non-polar solvent, or
(d) the non-polar solvent of step (c) comprises a hexane solvent.

13. The method of claim 1, wherein the thermal hydrolysis reaction is followed by the acidification reaction in a separate reaction vessel; or, the thermal hydrolysis reaction is followed by the acidification or acidulation reaction in a single reaction vessel as a "one pot" reaction.

14. The method of claim 1, wherein in step (b)(2) the pressure is created by water vapor pressure.

15. The method of claim 1, wherein in step (b)(3) the reaction time is between about 1 min to about 300 min.

16. The method of claim 15, wherein in step (b)(3) the reaction time is between about 5 min to 200 min.

17. The method of claim 1, wherein in step (b) the aqueous solution or aqueous mixture in the thermal hydrolysis reaction has a water content of between about 2:1 water-to-total dissolved solids (TDS) present in the mixed lipid feedstock to about 15:1 TDS.

18. The method of claim 17, wherein in step (b) the aqueous solution or aqueous mixture in the thermal hydrolysis reaction has a water content of about 10:1 TDS.

19. The method of claim 18, wherein in step (b) the aqueous solution or aqueous mixture in the thermal hydrolysis reaction has a water content of between about 1:1 TDS present in the mixed lipid feedstock to about 100:1 TDS.

20. The method of claim 1, wherein a solvent is added to the thermal hydrolysis reaction in an amount of between about 0.01:1 water-to-total dissolved solids (TDS) present in the mixed lipid feedstock to about 100:1 TDS, or about 10:1 TDS.

21. The method of claim 1, wherein step (c)(1) comprises cooling or allowing to cool the first reaction product to about 90° C.

22. The method of claim 1, wherein step (c)(1) comprises decreasing the pressure in the reaction vessel.

23. The method of claim 1, wherein step (c)(2) comprises adding to the first reaction product a stack gas or a $CO_2$ gas, thereby increasing pressure in the reaction vessel, and mixing or agitating the stack gas or the $CO_2$ gas with the first reaction product, to generate a second, or acidification, reaction mixture.

24. The method of claim 1, wherein in step (c)(2) the pressure is increased to about 100 psig, or greater than about 100 psig.

25. The method of claim 1, wherein in step (c)(2) carbonated water is added to the first reaction product after the cooling of the first reaction product.

26. The method of claim 1, wherein in step (c) the second reaction mixture is combined or mixed with the stack gas or the $CO_2$ gas for a sufficient amount of time to partially acidulate the soap in the second reaction mixture to generate a second reaction mixture product comprising free fatty acids, and bicarbonate or carbonate salt if $CO_2$ is used.

27. The method of claim 26, wherein in step (c) the second reaction mixture is combined or mixed with the stack gas or the $CO_2$ gas for a sufficient amount of time to substantially acidulate the soap in the second reaction mixture to generate a second reaction mixture product comprising free fatty acids, and bicarbonate or carbonate salt if $CO_2$ is used.

28. The method of claim 2, wherein in step (c), the glyceride comprises a monoglyceride, a diglyceride or a triglyceride; a tall oil, wherein optionally the tall oil comprises a liquid rosin tall oil; a gums product, optionally a chemically or enzymatically derived gums product; a crude biodiesel; a distillation bottom; a fat splitter emulsion, wherein optionally the fat splitter emulsion is purged from a fat splitter due to its accumulation when recycled; or, any combination thereof,
and optionally the gums product comprises phospholipids,
and optionally the gums product is generated during the degumming of a natural oil.

29. The method of claim 2, wherein the soapstock is obtained from alkaline neutralization of a crude natural oil.

30. The method of claim 8, wherein in step (a) the temperature in a range of between about 200° C. to 400° C., or 240° C. to 300° C., or at about 260° C.

31. The method of claim 8, wherein in step (b) the pressure is between about 750 and 850 psig, between about 850 and 1000 psig, between about 1000 and 1500 psig, or between about 1500 psig and 1800 psig.

32. The method of claim 11, wherein after the reaction vessel has reached a desired temperature and pressure to carry out the acidification or acidulation reaction of step 1(c), the resulting reaction mixture is agitated, or otherwise mixed in order to maximize the contacting of the soaps with the acid, optionally carbonic acid, and optionally the mixture can be agitated using a spinning blade mixer,
and optionally the mixture is agitated for between about 10 minutes to about 200 minutes, or optionally the mixture is agitated for between about 25 minutes to about 150 minutes, or between about 20 minutes to about 60 minutes, or about 30 minutes.

33. The method of claim 1, wherein after the acidification or acidulation reaction of step 1(c), and optionally following an agitation step, still under pressure, contents of the acidification or acidulation reaction are allowed to settle or partition allowing for the formation or separation of a lipid layer, a lipid phase or a lipid component, and an aqueous layer, an aqueous phase or an aqueous component, wherein the lipid layer or lipid phase floats on the top of the aqueous layer, and still under pressure the aqueous layer is removed,
and optionally the contents of the acidification or acidulation reaction of step 1(c) are allowed to settle or partition in the reaction vessel, or a decanter, a settler or an equivalent, or a centrifuge, where a lipid phase or component or separates or partitions out from an aqueous phase or component,
and optionally the lipid layer or lipid phase comprises free fatty acids and any non-acidulated soaps, and the aqueous layer comprises water, glycerol, phosphate salts, sodium bicarbonate, sodium carbonate or other equivalent salts, unsaponifiable material, optionally waxes and sterols, and dissolved carbonic acid.

34. The method of claim 33, wherein before the second reaction mixture product is allowed to settle or partition, the second reaction mixture products are transferred to a separation vessel, optionally a decanter, a settler or an equivalent, or a centrifuge, where the lipid layer or lipid phase or component separates or partitions out from an aqueous phase or component.

35. The method of claim 33, wherein the second reaction mixture product is not transferred to a separate vessel in order to separate lipids in the lipid layer or lipid phase from reaction products in an aqueous phase or component, and after the lipid layer or lipid phase or component separates or partitions out from the aqueous phase or component the aqueous layer is drained from a bottom of the reaction vessel and the remaining lipid layer or the lipid phase or component comprises the second reaction mixture product.

36. The method of claim 1, further comprising additional or multiple acidification or acidulation reactions, optionally between about 1 and 20 additional acidification or acidulation reactions, or about 1, 2, 3, 4, 5, 6, 7 or 8 or more additional acidification or acidulation reactions, wherein the additional or multiple acidification or acidulation reactions comprise addition of fresh water before the additional or multiple acidification or acidulation reaction, and settling or partitioning out of the lipid layer or lipid phase from the aqueous phase or component steps are repeated.

37. The method of claim 1, further comprising depressurizing the reaction vessel after the acidification of acidulation reaction of step 1(c), allowing for dissolved carbonic acid or other gaseous acid to separate out of the solution as a gaseous $CO_2$, or equivalents,
and optionally capturing the gaseous $CO_2$, or equivalents,
and optionally the captured $CO_2$ is recycled for use in the further acidulation reactions.

38. The method of claim 33, wherein the lipid layer or lipid phase or component, optionally comprising unreacted soaps, is transferred to an electrolysis unit, and the lipid layer or lipid phase or component is reacted with an anolyte such that the unreacted soaps generate free fatty acids,
and optionally the electrolysis step converts substantially all, or about 90%, 95%, 98% or more of the unreacted soaps to free fatty acids,
and optionally the electrolysis unit is a hydrogen evolving cathode (HEC) electrolysis unit,
and optionally the anolyte comprises a sodium or potassium sulfate, a sodium or potassium nitrate, or a sodium or potassium chloride.

39. The method of claim 33, wherein the lipid layer or lipid phase or component is transferred to an electrolysis unit comprising a vessel or suitable container comprising an anode, and a vessel or other suitable container comprising a cathode separated by a selective filtration membrane,
wherein optionally the anode comprises a mixed metal oxide (MMO) layer coated onto a stable metal substrate, and optionally the stable metal substrate comprises a titanium,
wherein optionally the anode comprises a mixed metal oxide (MMO) layer coated onto a stable metal substrate,
and optionally the stable metal substrate comprises a titanium,
and optionally the cathode comprises a titanium or a Monel alloy, or any substrate that is stable in a reducing environment,
and optionally the anode is an anode vessel,
and optionally the cathode is a cathode vessel,
and optionally the electrolysis unit is a hydrogen evolving cathode (HEC) electrolysis unit,
and optionally the selective filtration membrane is a polytetrafluoroethylene (PTFE) membrane.

40. The method of claim 33, wherein the aqueous phase or component, or multiple aqueous phases if collected from multiple acidulation or acidulation reactions, is treated to remove water,
wherein optionally the treatment of the aqueous phase or component to remove water is by a drying method,
thereby generating a product comprising sodium bicarbonate,
and optionally the product is dried further to generate a sodium bicarbonate product that is substantially free of any water, or has less than about 20% water or less than about 10% water,
and optionally the drying method comprises using a fluidized bed dryer, a lyophilizer, a spray dryer, or a rotary drum dryer,
and optionally the drying method comprises evaporation via falling film, forced recirculation flashing or equivalent.

41. The method of claim 33, wherein the aqueous phase or component, or multiple aqueous phases if collected from multiple acidulation or acidulation reactions, is treated using a filtration,
wherein optionally the filtration comprises a membrane filtration system, a nano- or microfiltration system or a size-exclusion filtration system,
and optionally the filtration is operationally in-line operating continuously with the acidulation step such that aqueous phase generated in the acidulation reaction, or each acidulation reaction if more than one acidulation reaction, is treated immediately after or during the point at which the aqueous phase is separated from the lipid phase,
and optionally the aqueous phase is collected and treated in a single batch,
and optionally soaps and/or other saponifiable material rejected by the filtration, or soaps and/or other saponifiable material that do not pass through a membrane of a filter system, are returned to the lipid layer or lipid phase or component for subsequent acidulation or acidulation reactions, thereby increasing the overall fatty acid yield.

42. The method of claim 33, wherein the aqueous phase or component, or multiple aqueous phases if collected from multiple acidulation or acidulation reactions, is treated with calcium hydroxide to form a calcium precipitate,
wherein optionally the calcium hydroxide comprises a slaked lime,
and optionally the calcium precipitate comprises a calcium phosphate ($Ca_x(PO_4)_x$) precipitate,
and optionally a slaked lime-treated aqueous phase or component, or multiple aqueous phases if collected from multiple acidulation reactions, is subjected to an oxidation step,
and optionally the oxidation step comprises a Fenton oxidation wherein hydrogen peroxide and $Fe^{2+}$ ions are used to catalyze OH radical formation.

43. The method of claim 33, wherein the aqueous phase or component, or multiple aqueous phases if collected from multiple acidulation or acidulation reactions, is or are subjected to electrolysis to recover monovalent ions as a base for a value added product,
wherein electrical current is passed through a cathode, the water is reduced, thereby generating hydroxide ions; and as monovalent ions are pushed across a membrane separating an anode vessel from a cathode vessel into the cathode vessel, they react with the generated hydroxide ions to generate a corresponding hydroxide base, wherein optionally the monovalent ions comprise sodium or potassium, and optionally the hydroxide base comprises a sodium hydroxide or a potassium hydroxide, and optionally the hydroxide base is separated out, recovered and/or isolated.

* * * * *